(12) United States Patent
Kim et al.

(10) Patent No.: US 9,374,688 B2
(45) Date of Patent: Jun. 21, 2016

(54) MOBILE TERMINAL AND METHOD FOR CONTROLLING THE SAME

(71) Applicant: LG ELECTRONICS INC., Seoul (KR)

(72) Inventors: Meejeong Kim, Seoul (KR); Byoungzoo Jeong, Seoul (KR); Junghyun Lee, Seoul (KR); Yoonseok Yang, Seoul (KR); Nayeoung Kim, Seoul (KR); Jaeyoung Ji, Seoul (KR); Younghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/319,971

(22) Filed: Jun. 30, 2014

(65) Prior Publication Data

US 2015/0148083 A1 May 28, 2015

(30) Foreign Application Priority Data

Nov. 28, 2013 (KR) .......... 10-2013-0146560
Dec. 17, 2013 (KR) .......... 10-2013-0157490

(51) Int. Cl.
*H04W 4/12* (2009.01)
*H04M 1/725* (2006.01)
*H04M 1/2745* (2006.01)

(52) U.S. Cl.
CPC ............ *H04W 4/12* (2013.01); *H04M 1/72552* (2013.01); *H04M 1/72583* (2013.01); *H04M 1/27455* (2013.01); *H04M 2250/22* (2013.01)

(58) Field of Classification Search
CPC .............. H04W 4/12; H04M 1/72583; H04M 2250/22; G06F 3/041; G06F 3/04817; G06F 3/0484; G09G 5/006
USPC ........... 455/466, 566; 345/592, 173, 156, 157
See application file for complete search history.

(56) References Cited

U.S. PATENT DOCUMENTS

| 2008/0309617 | A1* | 12/2008 | Kong | .................. | G06F 3/04817 345/157 |
| 2010/0045619 | A1 | 2/2010 | Birnbaum et al. | | |
| 2014/0035942 | A1* | 2/2014 | Yun et al. | ...................... | 345/592 |

FOREIGN PATENT DOCUMENTS

| WO | WO 03/028345 A1 | 4/2003 |
| WO | WO 2009/016347 A1 | 2/2009 |
| WO | WO 2011/130839 A1 | 10/2011 |

* cited by examiner

*Primary Examiner* — Phuoc H Doan
(74) *Attorney, Agent, or Firm* — Birch, Stewart, Kolasch & Birch, LLP

(57) ABSTRACT

A mobile terminal including a wireless communication unit configured to perform wireless communication; a touch screen; a sensor unit configured to detect a tapping input on the touch screen; and a controller configured to display an object on the touch screen corresponding to a counterpart terminal, receive a multi-tapping input on the object, and control the wireless communication unit to transmit a prescribed request message among a plurality of stored request messages to the counterpart terminal in response to the multi-tapping input.

21 Claims, 26 Drawing Sheets

FIG. 6
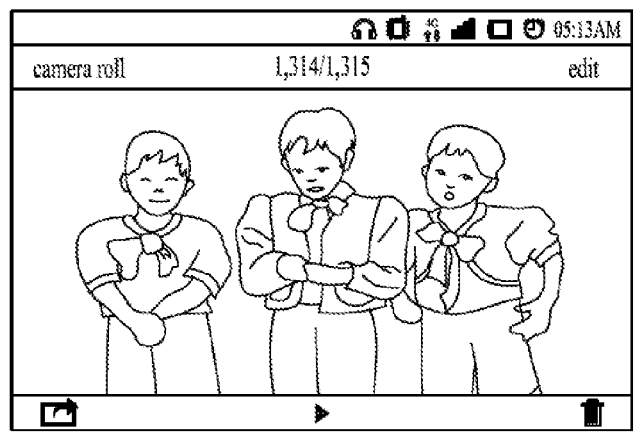
(a) general picture reading
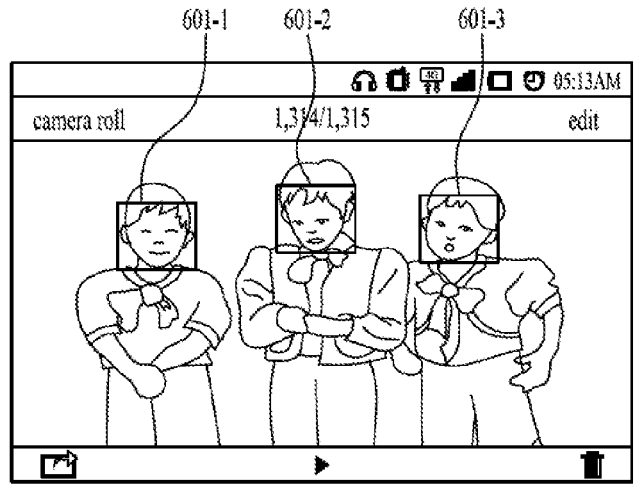
(b) activation of face recognition function
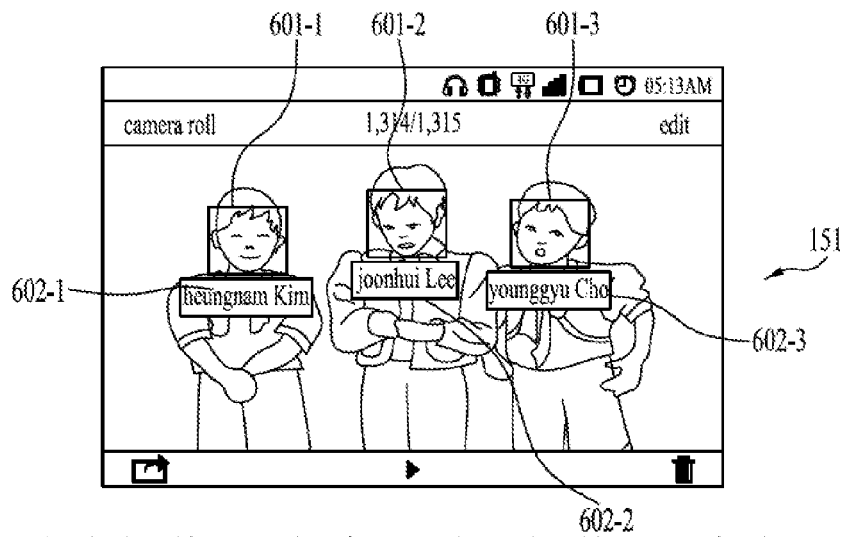
(c) activation of face recognition function and activation of face tagging function

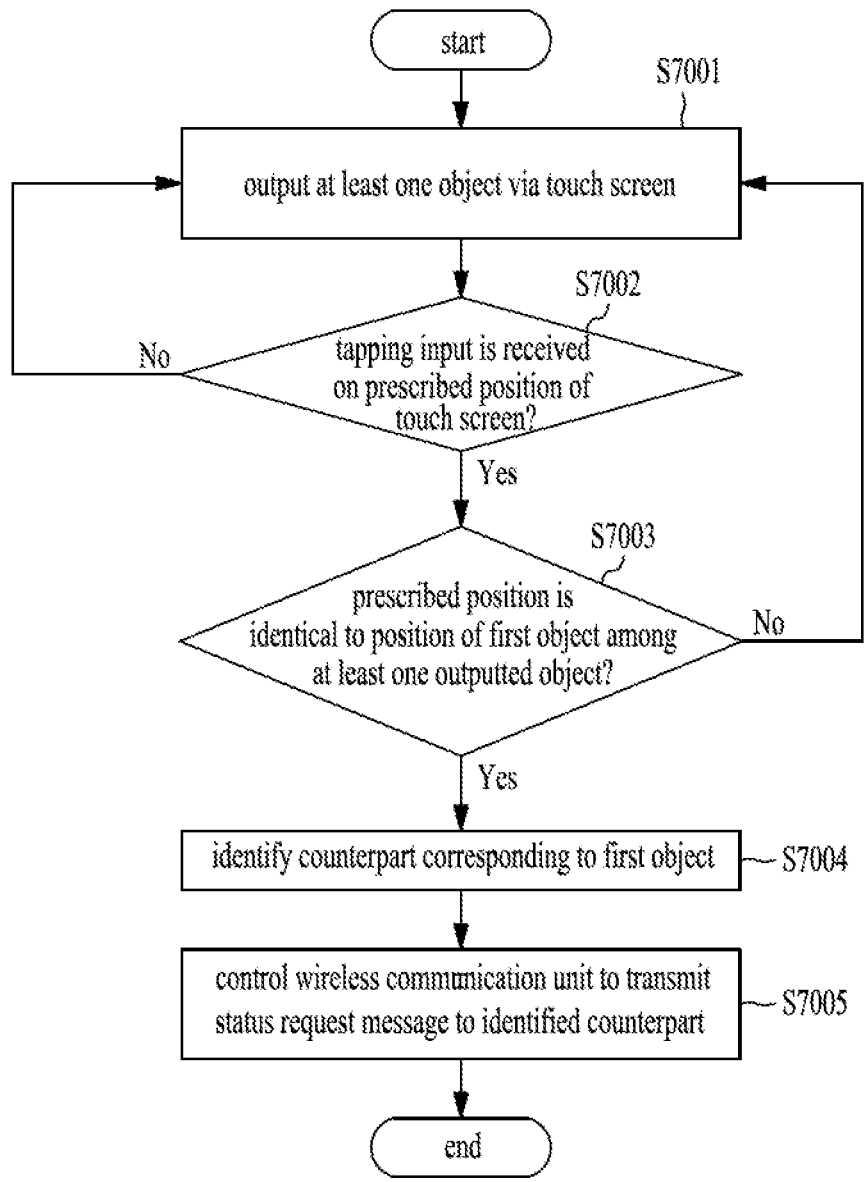

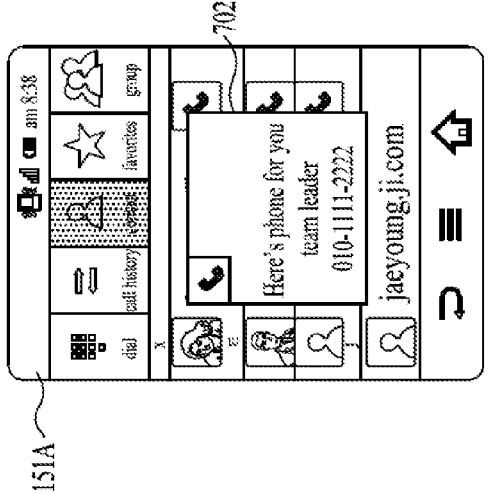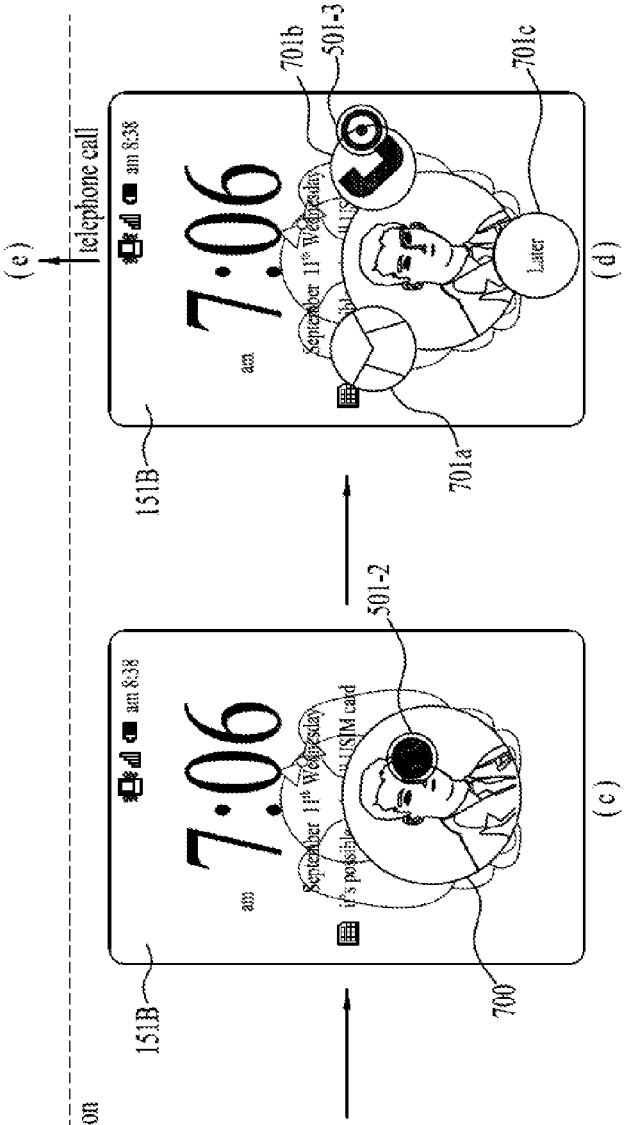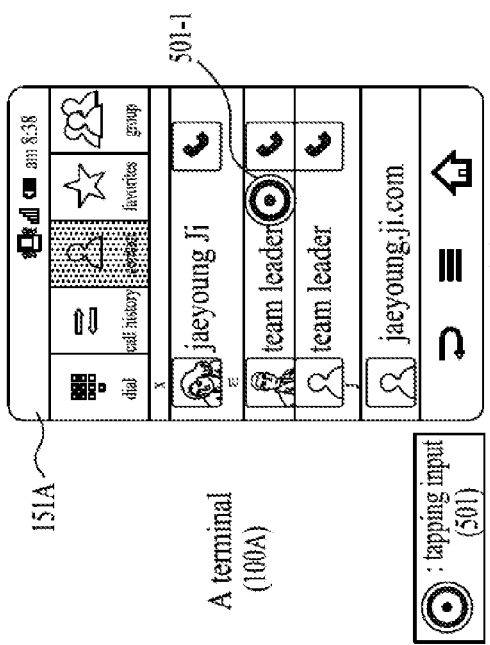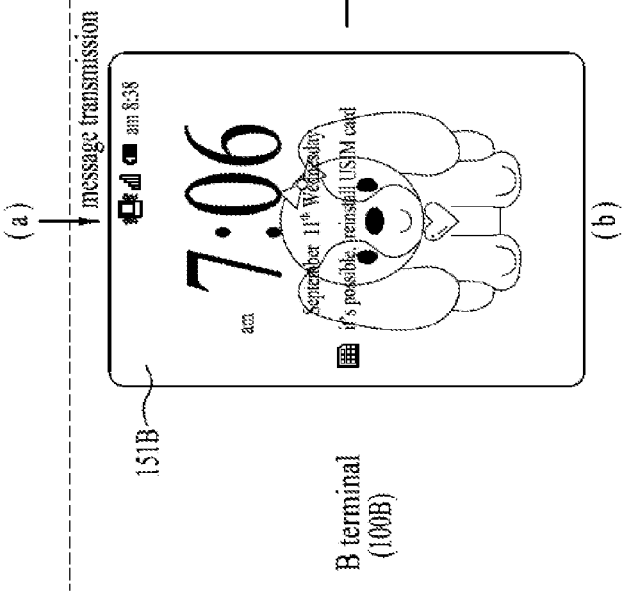
FIG. 7B

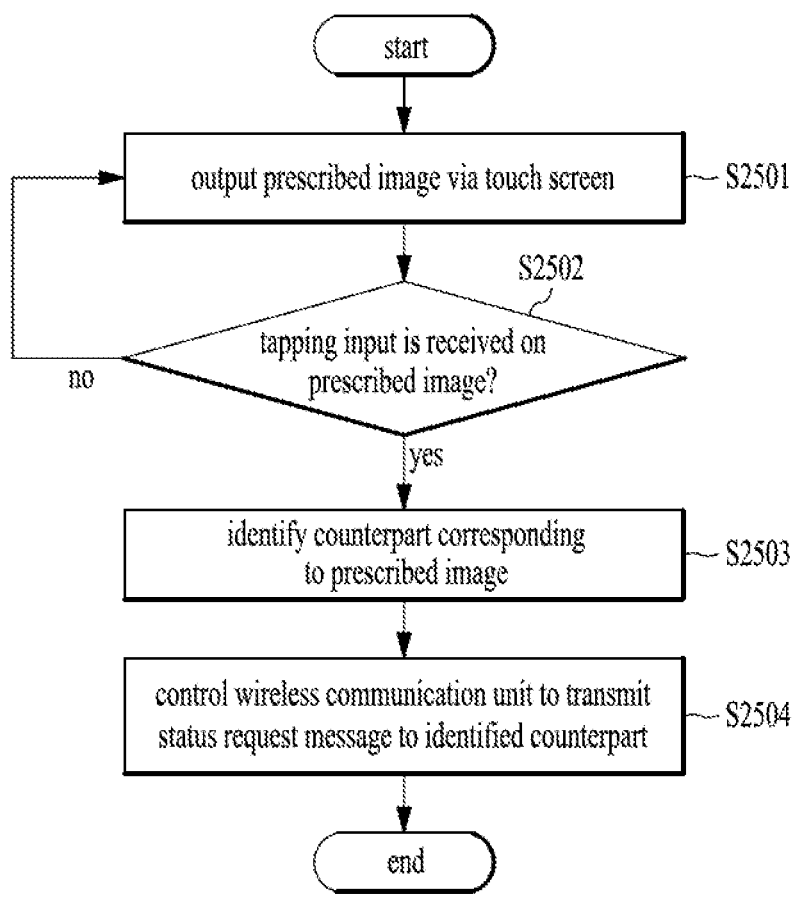

MOBILE TERMINAL AND METHOD FOR CONTROLLING THE SAME

Pursuant to 35 U.S.C. §119(a), this application claims the benefit of earlier filing date and right of priority to Korean Application No. 10-2013-0146560, filed on Nov. 28, 2013 and No. 10-2013-0157490, filed on Dec. 17, 2013, the contents of which are hereby incorporated by reference herein in their entirety.

BACKGROUND OF THE INVENTION

1. Field of the Invention

The present invention relates to a mobile terminal and an apparatus therefor enabling a user to more conveniently use the mobile terminal.

2. Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mounted terminals.

A touch screen is also widely utilized as an input and output mechanism, because the touch screen not only performs functions of both a user input unit and output unit but also plays a big role in providing an intuitive control of the mobile terminal. In more detail, the intuitive control is one of very important elements in terms of a user using the mobile terminal. Hence, development of a method of controlling a mobile terminal is focusing on developing an input scheme which is more intuitive to a user.

One intuitive input scheme corresponds to a tapping input scheme. The tapping input scheme corresponds to a user shortly tapping at one area (i.e., touch screen) of a mobile terminal with a prescribed time (at least once). The tapping input scheme is similar to an operation of a knock (or knock knock) on a door. The dictionary definition of the knock is to make a noise by lightly tapping at a door prior to entering a room.

Thus, a tapping operation may be intuitively recognized as an action for informing a predetermined counterpart with whom a user intends to contact of a presence of the user via a mobile terminal. In addition, a mobile terminal can detect the tapping input via various sensors/schemes.

For example, in a first method, the mobile terminal can detect the tapping input via a touch screen. If the touch screen is activated, the mobile terminal detects a touch input of a user input on the touch screen and can detect the tapping input via the detected touch input. However, this method has a drawback because the tapping input is input on the touch screen only.

As a second method of detecting the tapping input, the mobile terminal can detect the tapping input using an acceleration sensor. If a user taps at an area of a mobile terminal, the acceleration sensor detects acceleration change of the mobile terminal received by the tapping input and can deliver the acceleration change to a controller. The controller can then detect the tapping input via the acceleration change of the mobile terminal delivered from the acceleration sensor. However, the second method has a drawback because the sensitivity of the tapping input may be lower than that of the tapping input by a different input method.

As a third method of detecting the tapping input, the mobile terminal can detect the tapping input using both the touch screen and the acceleration sensor at the same time. When using both methods, the mobile terminal may well detect the tapping input by supplementing the drawbacks caused by each of the methods. However, this complicates the process of inputting information into the mobile terminal.

SUMMARY OF THE INVENTION

An object of the present invention is to provide a mobile terminal and a method of controlling therefor detecting a knock-on input, which is received on a body of the mobile terminal.

Another object of the present invention is to provide a more intuitive mobile terminal and a method of controlling therefor by detecting a knock-on input, which is received on a body of the mobile terminal.

Yet another object of the present invention is to provide a mobile terminal that can easily contacting a predetermined counterpart in response to a knock-on input received on a body of the mobile terminal, and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a wireless communication unit configured to communicate with a different terminal, a touch screen, a sensor unit configured to detect a tapping input which is received on the touch screen, and a controller configured to control the touch screen to output a prescribed image, if the tapping input, which is received on the output prescribed image, is detected, the controller configured to identify a counterpart terminal corresponding to the prescribed image, the controller configured to control the wireless communication unit to transmit a prescribed message to the identified counterpart terminal.

In addition, the controller is configured to recognize a face of at least one person included in the prescribed image and the identified counterpart terminal may correspond to a terminal corresponding to the recognized face.

The mobile terminal further includes a memory configured to store both at least one contact information and face recognition information and the controller can identify the counterpart terminal based on contact information corresponding to the recognized face among the at least one stored contact information.

Further, the controller can attach data on a whole or a part of the prescribed image to the prescribed message.

The mobile terminal further includes a memory configured to store at least one image data. In addition, the controller controls the wireless communication unit to receive a reply message for the transmitted prescribed message and can store at least one comment information included in the received reply message in the memory together with the prescribed image.

Further, if a comment display command for the prescribed image is received from a user via the touch screen, the controller can control the touch screen to output the comment information corresponding to the prescribed image stored in the memory.

To further achieve these objects and other advantages and in accordance with the purpose of the invention, as embodied and broadly described herein, a method of controlling a mobile terminal includes the steps of outputting a prescribed image in a touch screen, if a tapping input, which is received on the output prescribed image, is detected, identifying a counterpart terminal corresponding to the prescribed image, and controlling a wireless communication unit to transmit a prescribed message to the identified counterpart terminal.

It is to be understood that both the foregoing general description and the following detailed description of the present invention are explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 6 is a diagram illustrating recognizing a face included in an image and displaying a recognized result (face recognition information) together with the image according to one embodiment of the present invention;

FIG. 7A is a flowchart for a controlling method of transmitting a pre-stored message to a predetermined counterpart in response to a tapping input received from a user in a mobile terminal according to one embodiment of the present invention;

FIG. 7B is a conceptual diagram illustrating a controlling method of transmitting a pre-stored message to a predetermined counterpart in response to a tapping input received from a user in a mobile terminal according to one embodiment of the present invention;

FIG. 25 is a flowchart for a controlling method of identifying a counterpart in response to a tapping input, which is received on a prescribed image, and transmitting a prescribed message to the identified counterpart.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
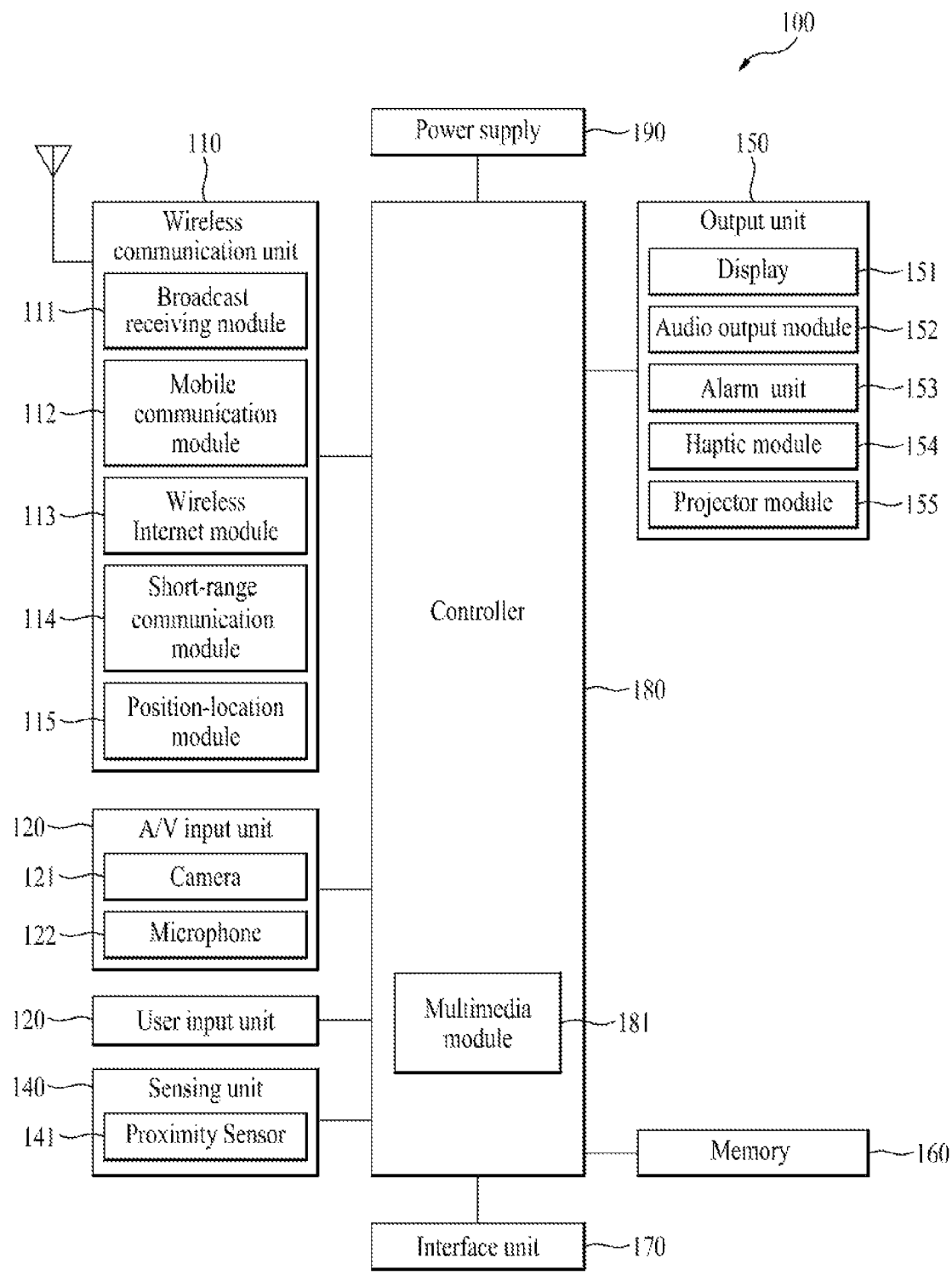
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components but greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode and the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Further, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

In addition, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
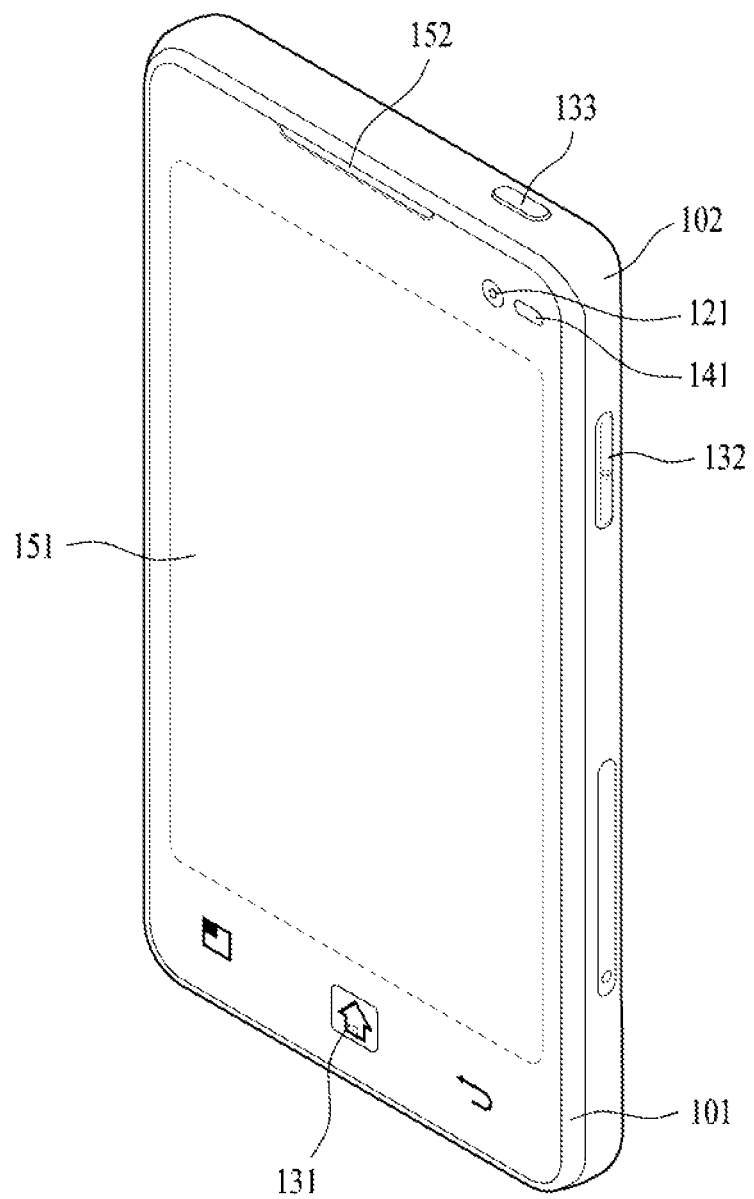
FIG. 2 is a front perspective diagram illustrating one example of a mobile or portable terminal according to an embodiment of the present invention.

Next, FIG. 2 is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further description will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example. A display 151, an audio output unit 152, a camera 121, user input units 130/131 and 132, a microphone 122, an interface 170 (FIG. 3) and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 3:
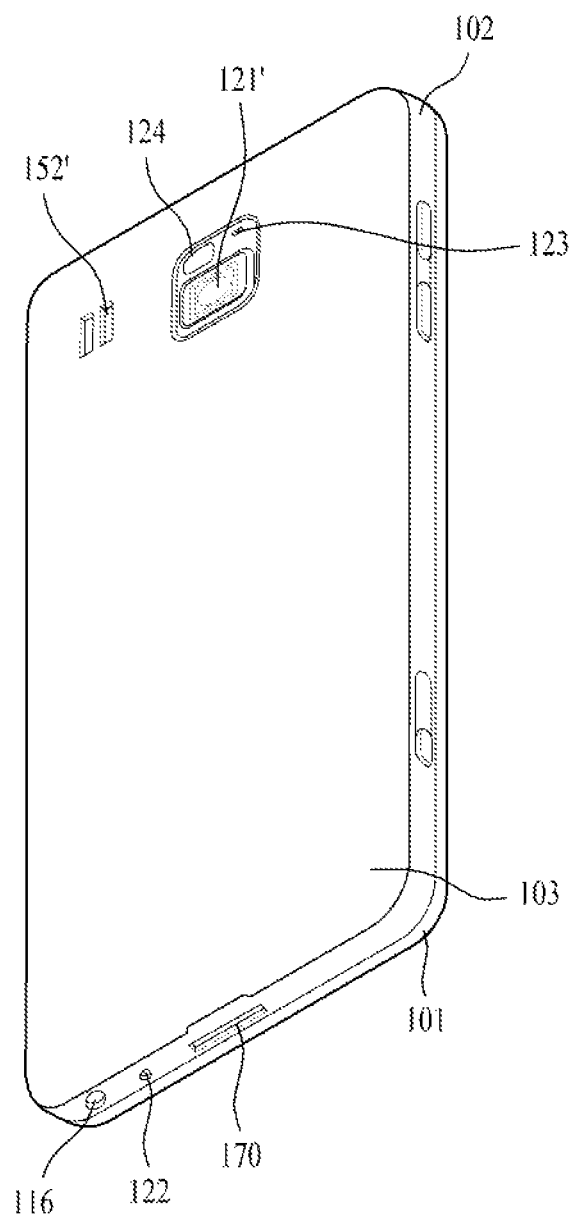
FIG. 3 is a rear perspective diagram of the mobile terminal shown in FIG. 2.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
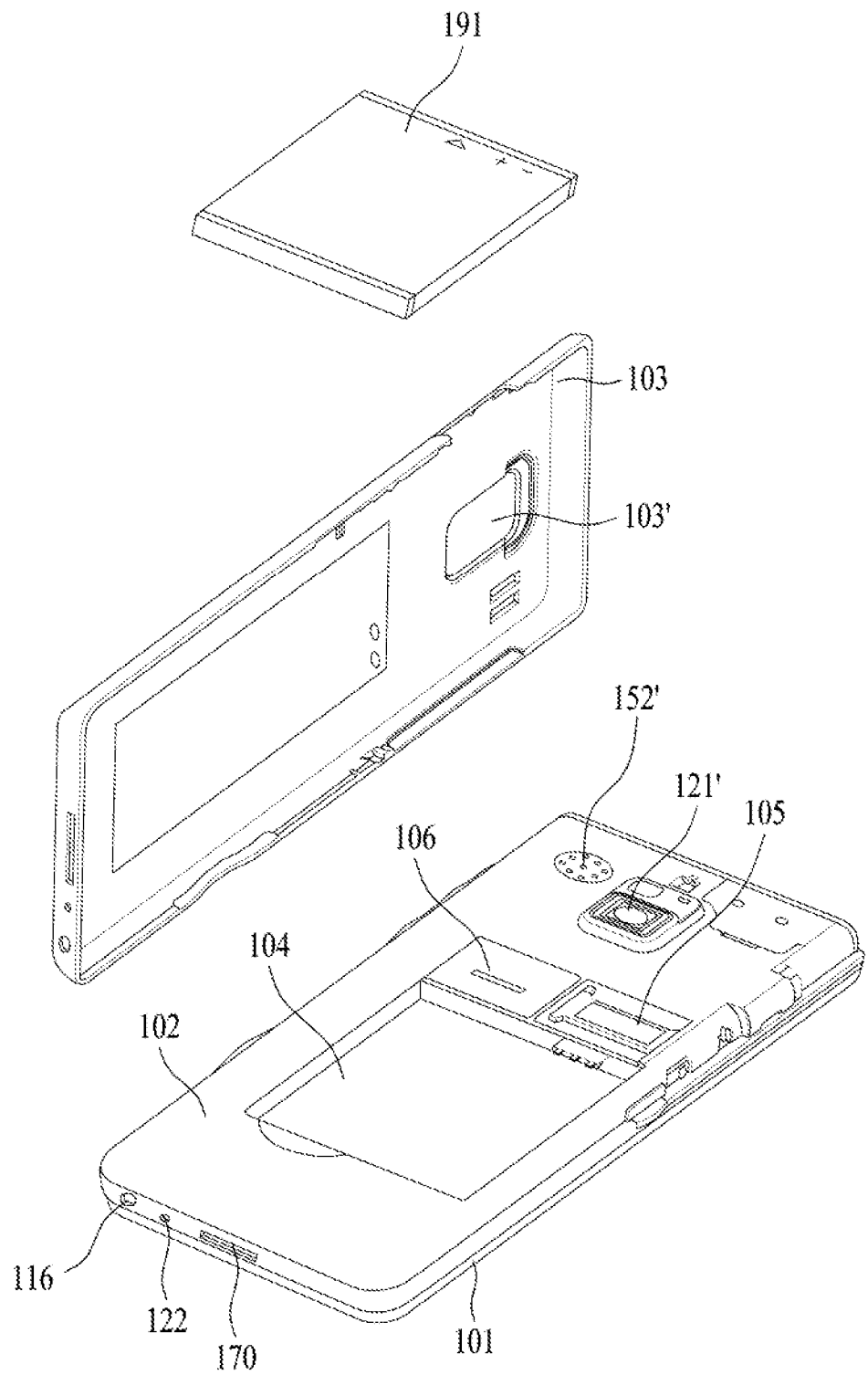
FIG. 4 is a rear perspective diagram of a surface of a rear case exposed by separating a rear cover of a mobile terminal according to one embodiment of the present invention.

Next, FIG. 4 is a rear perspective diagram of a surface of a rear case exposed by separating a rear cover of a mobile terminal according to one embodiment of the present invention. Referring to FIG. 4, a front case 101, a rear case 102, a rear cover (or a battery cover) 103, a camera 121', an interface unit 170, a microphone 122, an audio output unit 152', a battery 191, antenna 116, a battery loading unit 104, a USIM card loading unit 105, and a memory card loading unit 106 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. When the replaceable type is adopted, the battery loading unit 104 is formed on the surface of the rear case 102 to enable a user to detach the corresponding battery. In this instance, a contact terminal is provided to the battery loading unit 104 to be electrically connected to a part installed within the case.

The USIM card loading unit 105 or the memory card loading unit 106 may be provided, as shown in FIG. 4, next to the battery loading unit 104. Alternatively, the USIM card loading unit 105 or the memory card loading unit 106 may be provided to a bottom surface of the battery loading unit 104. Hence, the battery 191 can be externally exposed if the battery 191 is unloaded from the battery loading unit 104. In this instance, since a size of the battery loading unit 104 is extensible, the battery 191 can be oversized.

Although FIG. 4 shows the configuration that the USIM card loading unit 105 or the memory card loading unit 106 is mounted on a backside of the rear case 102, it can be inserted in or separated from the mobile terminal 100 by being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103. The rear cover can have a camera opening 103' for receiving the camera 121'.

As mentioned in the foregoing description, assume that the mobile terminal 100 according to one embodiment of the present invention can detect not only a tapping input of a user but also a strength of the tapping input.

According to the aforementioned first method for detecting a tapping input, the mobile terminal 100 can detect the tapping input by detecting a touch input of a user via a touch screen 151. For instance, if the touch input for touching the touch screen 151 lasts less than a prescribed time (e.g., 0.1 second), the controller 180 can judge the touch input which is input via the touch screen 151 as the tapping input. This is because, for the tapping input, the touch input should be input and released within a short time.

If a tapping input is defined as an at least twice tapped input, when a corresponding touch input is input as many as a predetermined times for a prescribed time interval, the controller 180 can judge that the tapping input is received.

Moreover, the controller 180 according to the first method determines a touch area of a user touch input received via the touch screen 151 and may determine the strength of the tapping input in proportion to the area of the touch area. If a user receives a tapping input of relatively weak strength, the user has no choice but to have a touch area, which is formed smaller than a touch area touched by a strong tapping input. This is because the more pressure a finger performing a touch has, the bigger area of the finger touching the touch screen 151.

Meanwhile, the controller 180 according to the second method for detecting a tapping input receives the tapping input by detecting an acceleration change of the mobile terminal according to a user tapping input and may detect the strength of the tapping input by detecting the strength of the acceleration change.

When a third method combining the touch screen of the first method with the acceleration sensor of the second method, a strength detection method of the first and the strength detection method of the second method can be combined with each other to detect the strength of a tapping input.

Meanwhile, when the touch screen 151 is activated, it is preferable to clearly distinguish a tapping input 601 input on the touch screen 151 from a general touch input. According to one embodiment, a first method for distinguishing the tapping input from the general touch input distinguishes the tapping input from the general touch input according to strength of inputs. In particular, if a touch input is input with strength greater than predetermined reference strength, the mobile terminal 100 according to one embodiment of the present invention recognizes the touch input as the general touch input. If a touch input is input with strength less than the predetermined reference strength, the mobile terminal can recognize the touch input as the tapping input.

According to one embodiment, a second method for distinguishing the tapping input from the general touch input distinguishes the tapping input from the general touch input according to duration time of touch inputs. In particular, if a touch input is input for more than a predetermined reference time, the mobile terminal 100 according to one embodiment of the present invention recognizes the touch input as the general touch input. If a touch input is input for less than the predetermined reference time, the mobile terminal can recognize the touch input as the tapping input.

According to one embodiment, a third method for distinguishing the tapping input from the general touch input distinguishes the tapping input from the general touch input according to whether there exists a contiguous touch input. In particular, if a touch input is input one time for a predetermined reference interval, the mobile terminal 100 according to one embodiment of the present invention recognizes the touch input as the general touch input. If a touch input is input at least twice for the predetermined reference interval, the mobile terminal can recognize the touch input as the tapping input.

One embodiment of the present invention described in the following is explained in an assumption that strength of a tapping input can be detected by at least one of the aforementioned methods.

Figure 5:
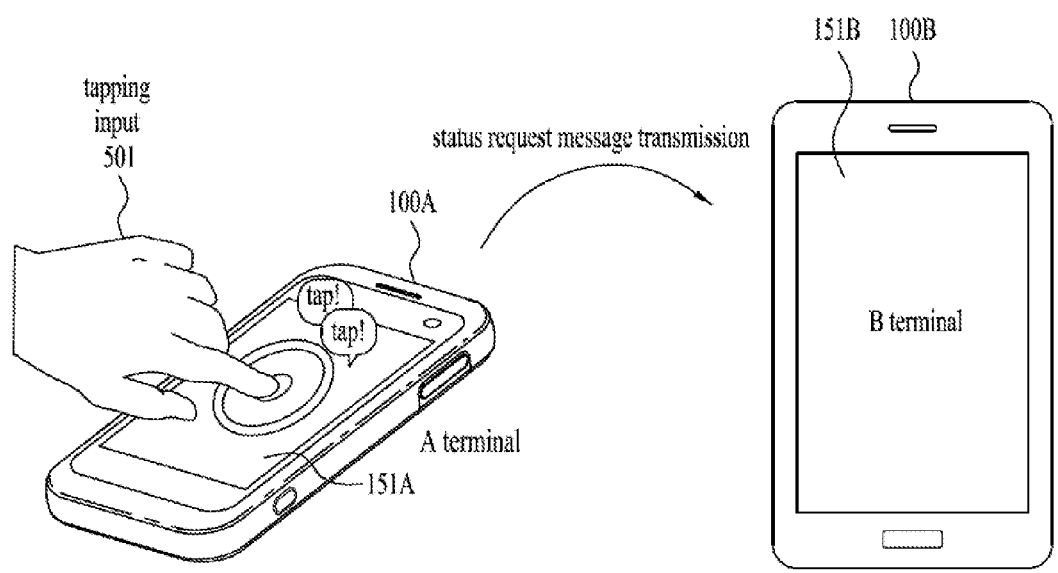
FIG. 5 is a conceptual diagram illustrating transmitting a prescribed message in response to a tapping input in a method of controlling a mobile terminal according to one embodiment of the present invention.

Next, FIG. 5 is a conceptual diagram illustrating transmitting a prescribed message in response to a tapping input in a method of controlling a mobile terminal 100 according to one embodiment of the present invention. An intuitive operation of a tapping input 501 is proposed in one embodiment of the present invention. As mentioned in the foregoing description, the tapping input 501 is used as a knock operation in everyday life.

According to the dictionary definition, the knock operation is used for informing somebody of a presence of a person. Hence, if the tapping input is received from a user, the mobile terminal 100 according to one embodiment of the present invention transmits a message for informing a prescribed counterpart of a presence of the user or a message (hereinafter called a status request message) for inquiring whether a contact to the counterpart is available (whether the counterpart is currently able to make a telephone call or a text message).

In particular, as depicted in FIG. 5, if the tapping input 501 is received from the user, an A terminal 100A according to one embodiment of the present invention can control the wireless communication unit 110 to transmit a status request message to a B terminal 100B. A message transmission according to one embodiment of the present invention may be different from a general text message transmission and reception in terms of the following points.

First of all, the controller 180 can transmit a message via an input more convenient and intuitive compared to the transmission and reception of a general text message. Secondly, a recipient counterpart can be easily specified. There may exist various kinds of objects output via a touch screen. If a prescribed counterpart (a terminal of the prescribed counterpart) can be specified by the various kinds of objects output via the touch screen, one embodiment of the present invention can be applied. In particular, if a tapping input is received on an object, a message can be transmitted by specifying a counterpart terminal corresponding to the object.

Thirdly, the message transmission according to one embodiment of the present invention uses a pre-stored text message. Hence, in transmitting a message to a counterpart, it is not necessary to separately perform a text input. Moreover, one embodiment of the present invention further proposes a method of identifying a simple intention (intention of transmitting a message) and the like of a transmitter. The intention of transmitting the message of the transmitter can be transmitted to the counterpart together with a single pre-stored text message among a plurality of pre-stored text messages in a manner that the single pre-stored text message is selected from a plurality of the pre-stored text messages according to a pattern of a tapping operation or a selective input of a user which is received after the tapping operation is performed.

In response to a tapping input received from a user, a method for an A terminal 100A to identify a counterpart (specifically, a counterpart terminal) to which a prescribed message is to be transmitted, a method for the A terminal 100A to select/write the prescribed message, a method for a B terminal 100B to display a received message, a method for the B terminal 100B to reply to the message, and if the A terminal receives a reply of the B terminal, a method for the A terminal to display the reply of the B terminal are explained in detail in one embodiment of the present invention described in the following.

The A terminal 100A and the B terminal 100B are representatively appeared in the present invention to explain embodiments of the present invention. Configuration elements of each terminal shall be distinguished from each other using 'A' and 'B'. In particular, when representing the controller 180 among the configurations of the mobile terminal 100, a controller of the A terminal 100A and a controller of the B terminal 100B are displayed as an A controller 180A and a B controller 180B, respectively.

In the following description, a controlling method implementable in the aforementioned mobile terminal and associated embodiments are explained with reference to attached drawings. In particular, face recognition within an image and face recognition information are explained with reference to FIG. 6.

For clarity of drawings, a case forming an exterior of the mobile terminal 100 is omitted in a drawing used illustrating one embodiment of the present invention to be explained in the following. Instead, a constitutional diagram of a screen, which is displayed in a touch screen 151 of the mobile terminal 100, is depicted only.

FIG. 6 is a diagram illustrating recognizing a face included in an image and displaying a recognized result (face recognition information) together with the image according to one embodiment of the present invention. In particular, FIG. 6 (*a*) is a diagram illustrating viewing a general picture and an image displayed in FIG. 6 (*a*) includes 3 persons.

The controller 180 according to one embodiment of the present invention can recognize a face of each person included in the image via an algorithm capable of analyzing faces belong to the image. The algorithm analyzes eyes, a nose, or a mouth of a person in the image and can recognize a face of the person using the analyzed eyes, the nose, or the mouth. In the following detailed explanation explaining one embodiment of the present invention, a result recognized by the algorithm shall be called face recognition information.

The face recognition information may include relative location information of a recognized face in a whole area to which the image is output. In addition, if pluralities of persons appear in a picture, the face recognition information may correspond to individual information on at least one person among a plurality of the persons. Hence, if pluralities of persons appear in an image, the face recognition information of the image may include a face recognition result for at least one person among a plurality of the persons.

FIG. 6 (*b*) is a diagram illustrating displaying recognized faces identified from each other. The controller 180 can also output face indicators 601-1 to 601-3 on the recognized faces in an output picture. In particular, the controller 180 can also display the face indicators 601-1 to 601-3 together with the output of the picture based on location information of faces included in the analyzed face recognition information.

Moreover, the algorithm can identify a person from the persons whose faces are recognized by analyzing a feature of eyes, a node, or a mouth, which varies according to every single person. In particular, the controller 180 can judge whether a face recognized in the picture is identical to a face appearing in pictures stored in the contact in advance in manner of comparing the faces with each other. By doing so, if it is judged that the face recognized in the picture is identical to the face stored in the contact in advance, the controller 180 can further display additional information on a corresponding person which is stored in the contact of the person.

In particular, the controller 180 analyzes a face in an image, identifies the face, and can then match the face with specific contact information. In addition, the matched contact information can be additionally displayed in the image. As depicted in FIG. 6 (*c*), the controller 180 can output name tags 602-1 to 602-3 for the persons whose faces are recognized as the additional information together with the picture, as an example of the additional information.

Figure 7C:
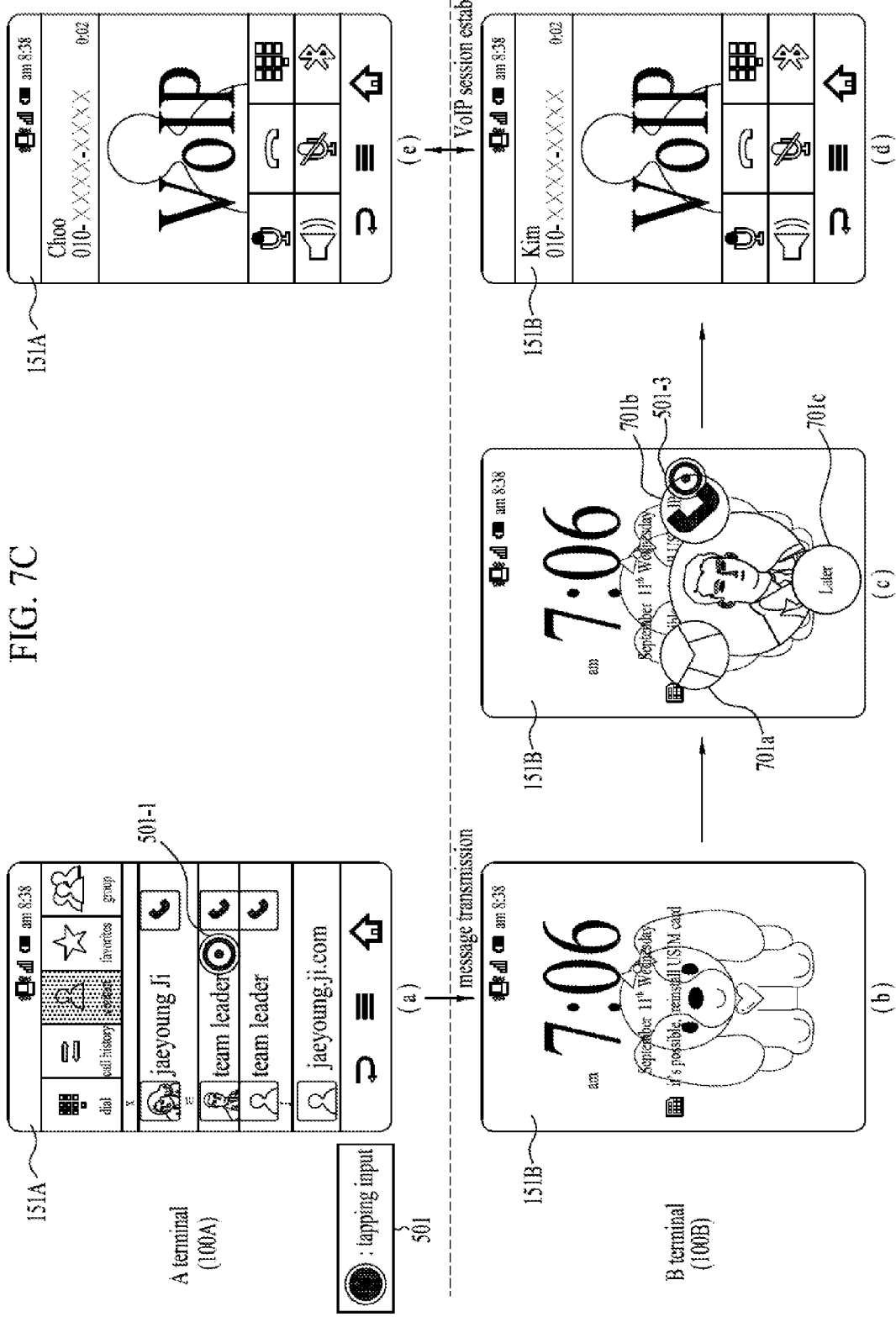
FIG. 7C is a conceptual diagram illustrating a controlling method of setting a VoIP (Voice over Internet Protocol) session with a predetermined counterpart in response to a tapping input received from a user in a mobile terminal 100 according to one embodiment of the present invention.

Next, FIG. 7A is a flowchart for a controlling method of transmitting a pre-stored message to a predetermined counterpart in response to a tapping input received from a user in a mobile terminal 100 according to one embodiment of the present invention. FIG. 7B is a conceptual diagram illustrating a controlling method of transmitting a pre-stored message to a predetermined counterpart in response to a tapping input received from a user in a mobile terminal 100 according to one embodiment of the present invention. Further, FIG. 7C is a conceptual diagram illustrating a controlling method of setting a VoIP (Voice over Internet Protocol) session with a predetermined counterpart in response to a tapping input received from a user in a mobile terminal 100 according to one embodiment of the present invention. In the following description, the controlling method is explained with reference to FIG. 7A to FIG. 7C.

In the step S7001, the controller 180 outputs at least one object via an A touch screen 151A. Referring to FIG. 7B (a), the A touch screen 151A of A terminal 100A displays a contact list when a phone call transceiving application is executing and the contact list outputs at least one contact object. In the step S7002, an A controller 180A determines whether a tapping input 501 is received on a prescribed position of the touch screen 151A.

If the tapping input is not received (No in S7002), the step S7001 may be repeated. As depicted in FIG. 7B (a), if a tapping input 501-1 is received on such a contact object as 'team leader', the A controller 180A can identify a counterpart terminal corresponding to the contact object such as 'team leader' (S7004). Specifically, the A controller 180A can identify the counterpart terminal corresponding to the contact object such as 'team leader' using a telephone number or other terminal identification information of the counterpart terminal. Subsequently, the A controller 180A can control an A wireless communication unit 110A to transmit a first status request message to the identified counterpart terminal 100B.

The status request message indicates a message which is transmitted in response to the tapping input and may correspond to a pre-stored message. In addition, a specific message is selected from a plurality of pre-stored messages and the selected message can be transmitted. Regarding a process of selecting a specific message from pre-stored messages or a plurality of messages, it shall be described later with reference to FIG. 9 to FIG. 11. Assume that there is a single pre-stored message in embodiment described in FIG. 7B.

The first status request message can also include identification information of the A terminal 100A of a transmitting side. The identification information of the A terminal 100A of the transmitting side may correspond to a contact information. In the same manner, a status request message described in the following can also include the identification information of the A terminal 100A of the transmitting side.

Referring back to FIG. 7B (b), a B terminal 100B displays a lock screen via a B touch screen 151B. As depicted in FIG. 7B (c), having received the first status request message from the A terminal 100A, the B terminal 100B can display a first notification object 700 notifying that the first status request message is received via the B touch screen 151B.

In an example depicted in FIG. 7B (c), the first notification object 700 can be directly displayed on the lock screen and may include either a picture of a counterpart who has transmitted the message or a picture of a person who has received the message. Meanwhile, a form of a notification object is non-limited by the first notification object 700. Embodiments of the present invention may be applicable to an object no matter what the object has a form, if the object is capable of informing a user of information.

If an input 501-2 for selecting the first notification object 700 is received from a user (hereinafter B user) using the B terminal 100B, a B controller 180B can display at least one reply option icon 701a to 701c in the B touch screen 151B. Subsequently, if an input 501-3 for selecting one of the at least one reply option icon 701a to 701c is received from the B user, the B controller 180B can control a B wireless communication unit 110B to reply a second status request message to the A terminal 100A.

Meanwhile, in an example depicted in FIG. 7B (d), assume that the option icon includes a telephone call option icon 701b and the telephone call option icon 701b is selected by the B user. The telephone call option icon 701b is an option for replying to the A terminal 100A, which has transmitted the first status request message, by making a call to the A terminal. The B controller 180B can control the B wireless communication unit 110B to transmit a call signal to the A terminal in response to the telephone call option icon selected by the B user (refer to FIG. 7B (d) and (e)).

Having received the call signal from the B terminal 100B, the A terminal 100A can display a pop-up window 702 indicating that the call signal is receiving (refer to FIG. 7B (e)).

Meanwhile, according to a different embodiment of the present invention, a controlling method of directly setting a VoIP (voice over internet protocol) session is proposed as one of the reply options. Regarding this embodiment, it shall be explained with reference to FIG. 7C.

Referring to FIG. 7C (a), the A touch screen 151A of the A terminal 100A displays a contact list when a call transceiving application is executing and the contact list outputs at least one contact object. As depicted in FIG. 7 (a), if a tapping input 501-1 is received on such a contact object as 'team leader', the A controller 180A identifies a counterpart terminal corresponding to the contact object such as 'team leader' and can control the A wireless communication unit 110A to transmit a first status request message to the identified counterpart terminal 100B (this is identical to the process of FIG. 7B).

As depicted in FIG. 7C (b), having received the first status request message from the A terminal 100A, the B terminal 100B, which displays a lock screen, can display a first notification object 700. Similar to FIG. 7B, if an input 501-2 for selecting the first notification object 700 is received, the B controller 180B can display at least one reply option icon 701a, 701b, and 701d in the B touch screen 151B. According to an example depicted in FIG. 7C, a VoIP call option icon 701d is included in the at least one reply option icon 701a, 701b, and 701d.

Having received an input for selecting the VoIP call option icon 701d from a user, the B controller 180B can control the B wireless communication unit 110B to set a VoIP session with the A terminal 100A in response to the input of the user (refer to FIG. 7C (d) and (e)). In particular, embodiment of the present invention proposes not only setting the VoIP session but also entering a state in which a call is immediately available.

In FIG. 7B and FIG. 7C, having received the first status request message, the B terminal 100B controls the first notification object 700 to be displayed via the B touch screen 151B. In the following description, an additional operation of the first notification object 700 is explained with reference to FIG. 8.

Figure 8:
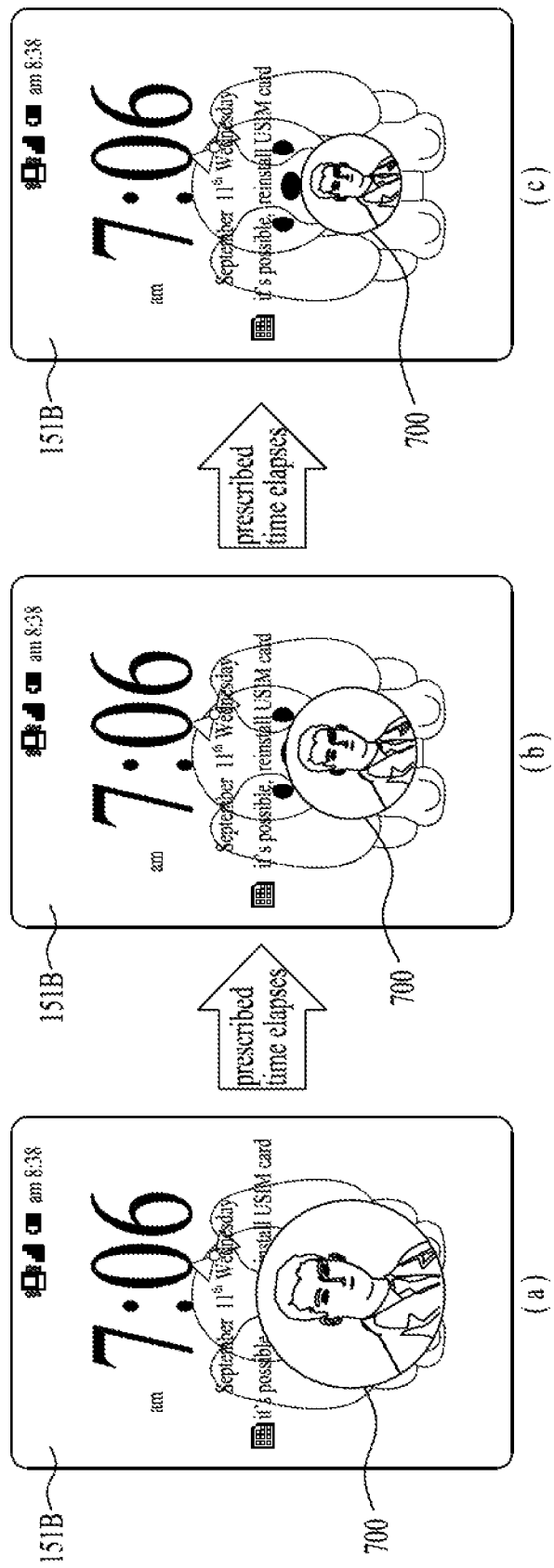
FIG. 8 is a diagram illustrating an example of a notification object operation which is displayed in response to reception of a status request message according to one embodiment of the present invention.

FIG. 8 is a diagram illustrating an example of a notification object operation which is displayed in response to reception of a status request message according to one embodiment of the present invention. Referring to FIG. 8 (a), the B terminal 100B displays a first notification object 700 in response to reception of a status request message. According to one embodiment of the present invention, it is proposed that the first notification object 700 is gradually getting smaller and smaller as time goes by (refer to FIGS. 8 (b) and (c)).

A purpose of one embodiment of the present invention which is explained with reference to FIG. 8 is to transmit a status request message via a tapping input (knock input) to make a request for a reply for a status on a timing point of transmitting the status request message to a counterpart (B user). Hence, if the B user 100B does not make a prompt reply, a timing point, which is preferred by a transmitting side, elapses. Hence, the B controller 180B controls a size in which the notification object is displayed to be gradually getting smaller and smaller. If the size is reduced more than a predetermined size (if predetermined time elapses), the B controller can control the B terminal to stop displaying the notification object.

In one embodiment of the present invention explained with reference to FIG. 6 to FIG. 8, a message for simply inquiring a status of a recipient is transmitted. According to a different embodiment, which shall be described with reference to FIG. 9 to FIG. 11, it is proposed that a message for proposing a specific action is transmitted to the recipient. In particular, various types of status request messages are proposed in the embodiment to be described, whereas a type of the transmitted status request message is not various in the aforementioned embodiment.

Hence, the mobile terminal 100 according to one embodiment of the present invention stores a plurality of status request messages in advance and can then transmit a single status request message according to an input pattern or a selection of a user. In the following description, embodiment of the present invention is explained in detail with reference to the attached drawings.

Figure 9:
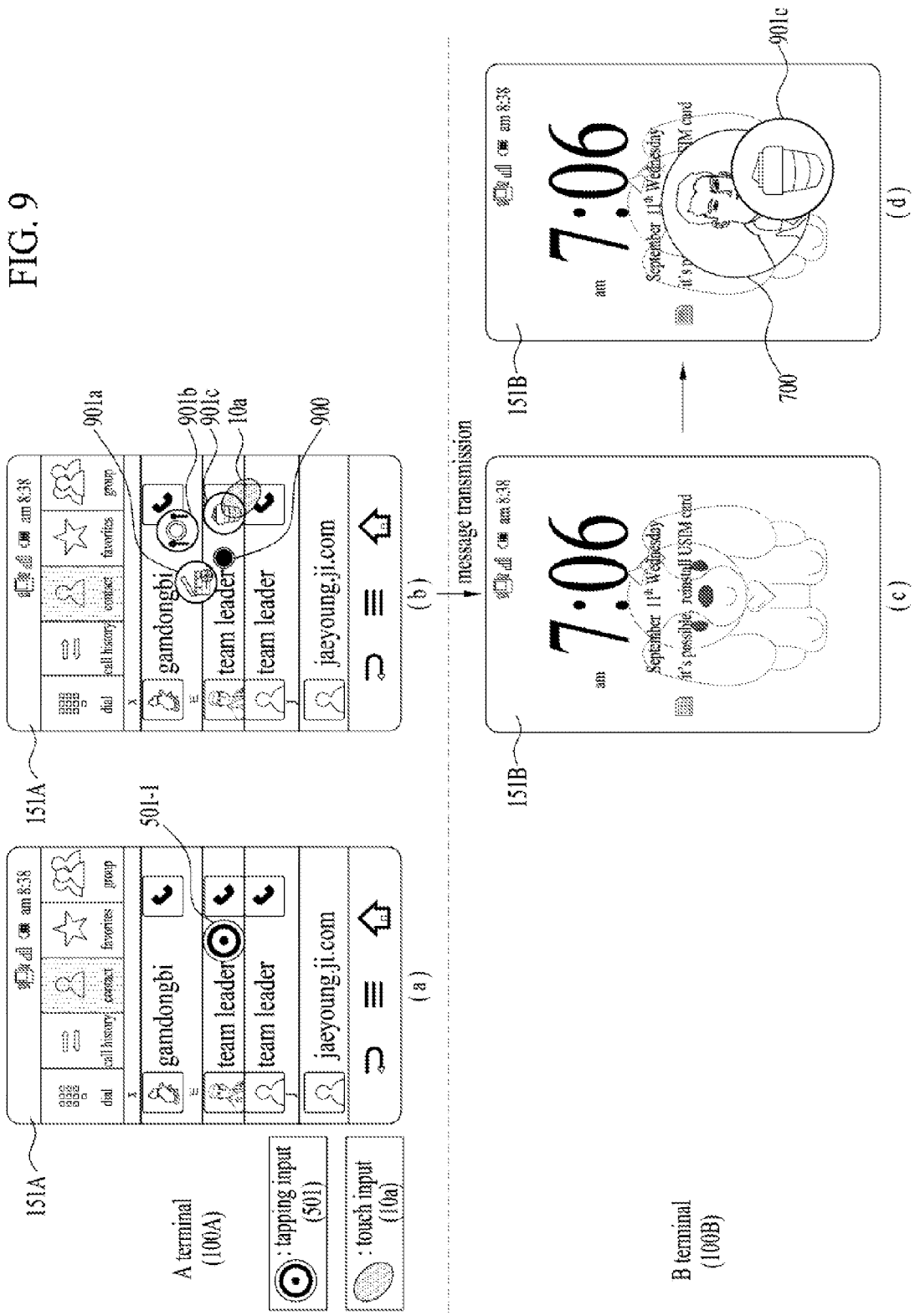
FIG. 9 is a diagram illustrating a controlling method of transmitting a status request message among a plurality of status request messages by determining the status request message in accordance with a selection of a user according to one embodiment of the present invention.

FIG. 9 is a diagram illustrating a controlling method of transmitting a status request message among a plurality of status request messages by determining the status request message in accordance with a selection of a user according to one embodiment of the present invention.

Referring to FIG. 9 (a), at least one contact object is displayed in the A touch screen 151A. In addition, assume that a tapping input 501-1 is received on a 'team leader' object via the A touch screen 151A which is identical to the A touch screen depicted in FIG. 7.

Unlike FIG. 7, the A controller 180A can display at least one theme object 901a to 901c in response to the tapping input 501-1. If the A user selects 10a one of the displayed at least one theme object 901a to 901c, the A controller transmits a second status request message based on the selected theme object. In particular, the A terminal 100A stores a plurality of status request messages in a manner that each of a plurality of the status request messages correspond to a theme, determines a status request message corresponding to the theme selected by a selection of a theme object among a plurality of the status request messages stored in the A terminal, and can then transmit the determined status request message to the B terminal 100b.

Among the at least one theme object, a theme may include at least one of a movie, coffee, meals, and a stroll. In an example depicted in FIG. 9 (b), a third theme object 901c, which proposes a cup of coffee among a first to third theme object 901a to 901c, is selected. The A controller 180A can control the A wireless communication unit 110A to transmit the second status request message corresponding to the selected third theme object 901c. The A user can inquire about whether the B user is available for having a cup of 'coffee', which corresponds to the selected option, via the second status request message. By doing so, the A user can deliver an intention of the A user to the B user with a simple operation only.

Having received the second status request message, the B controller 180B of the second terminal 100B can display the third theme object 901c together with the first notification object 700 to deliver the intention of the A user to the B user (refer to FIG. 9 (d)). In an example depicted in FIG. 9 (d), the third proposed option icon 901c is depicted with an icon in which a shape of a coffee cup is drawn.

The aforementioned embodiment, which is explained with reference to FIG. 9, describes an intention of a user is delivered via a selection from a plurality of themes. In the following FIG. 10, a controlling method capable of delivering urgency/instancy of a user is proposed.

Figure 10:
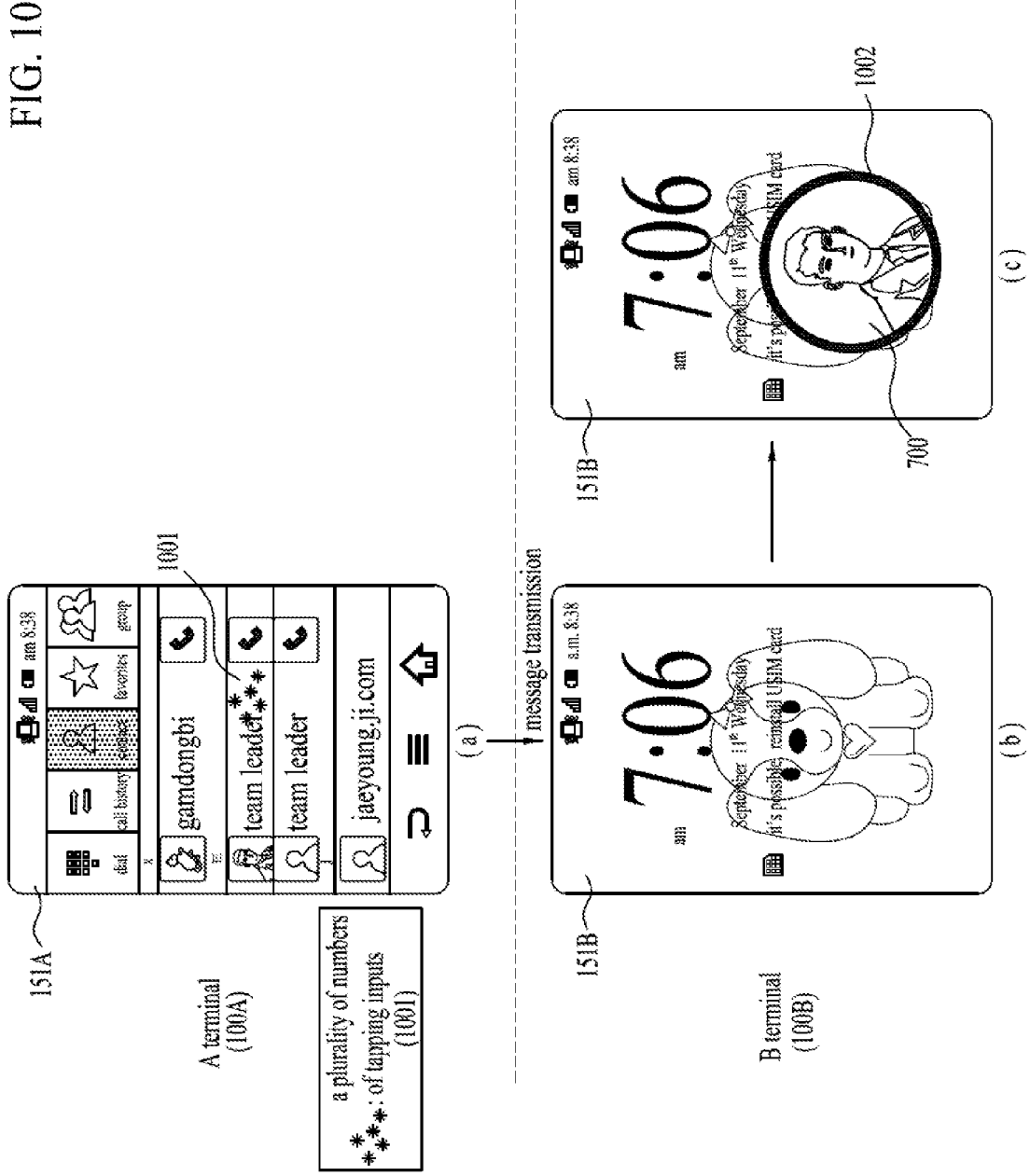
FIG. 10 is a diagram illustrating a controlling method of transmitting a status request message for further requesting a prompt reply according to one embodiment of the present invention.

FIG. 10 is a diagram illustrating a controlling method of transmitting a status request message for further requesting a prompt reply according to one embodiment of the present invention. According to the aforementioned embodiments of the present invention, the A user transmits a message requesting a prescribed reply to the B user. Yet, if the A user is in a situation that a prompt reply is required since the B user does not reply or it is an urgent situation, the A user may want to transmit a message for hastening a reply to the B user.

According to one embodiment of the present invention, as an input for transmitting the message, which hastens the reply of the B user, a tapping input can be input many times. In particular, if the tapping input (hereinafter called multiple tapping inputs) is received more than a predetermined number within a predetermined time interval from the A user, the A terminal 100A can transmit a status request message (hereinafter third status request message) for requesting a prompt reply to the B terminal 100B.

As depicted in FIG. 10 (a), the A terminal 100A displays at least one contact object. If multiple knock inputs 1001 are received on such a contact object as 'team leader', the A controller 180A can transmit a third status request message to the B terminal 100B. Having received the third status request message, which corresponds to a message for requesting a prompt reply, the B terminal 100B can display a first notification object 700 and can further display an emphasis indicator 1002 to indicate that the prompt reply has been requested as shown in FIGS. 10(b) and (c).

Figure 11:
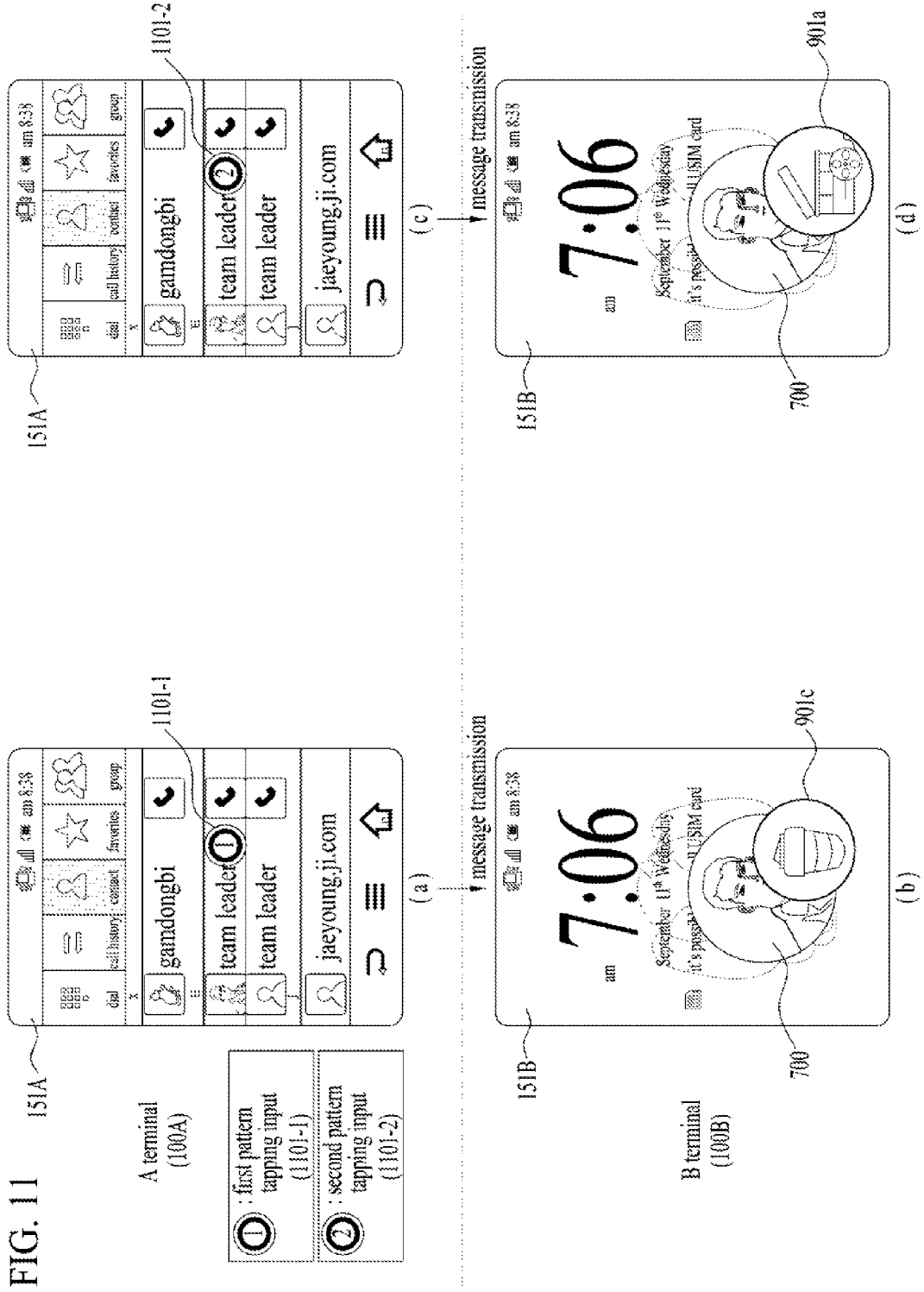
FIG. 11 is a diagram illustrating a controlling method of detecting a pattern of a tapping input and transmitting a status request message corresponding to the detected pattern in a mobile terminal 100 according to one embodiment of the present invention.

Next, FIG. 11 illustrates a pattern of a tapping input by a user is further detected and a status request message is determined according to the pattern of the tapping input. In particular, FIG. 11 is a diagram illustrating a controlling method of detecting a pattern of a tapping input and transmitting a status request message corresponding to the detected pattern in a mobile terminal 100 according to one embodiment of the present invention.

A tapping pattern may include at least one of the number of tapping inputs, the strength of the tapping input, the time interval between tapping inputs when receiving a plurality of the tapping inputs, and an orientation of a touch input which is received after a tapping is received, by which the embodiment of the present invention may be non-limited.

Referring to FIG. 11 (a), the A terminal 100A displays at least one contact object and receives a tapping input 1101-1 of a first pattern on the 'team leader' contact object. Having received the tapping input 1101-1 of the first pattern, the A controller 180A determines a fourth status request message, which corresponds to the tapping input 1101-1 of the first pattern, among a pre-stored plurality of status request messages and can then transmit the determined fourth status request message to the B terminal 100B.

In an example depicted in FIG. 11 (a), assume that the status request message corresponding to the tapping input 1101-1 of the first pattern is a status request message corresponding to a coffee theme and a tapping input 1101-2 of a second pattern is a status request message corresponding to a movie theme. Having received the fourth status request message, the B terminal 100B can display a third theme object 901c corresponding to the fourth status request message (refer to FIG. 11 (b)). On the contrary, having received a fifth status request message corresponding to the tapping input 1101-2 of the second pattern, the B terminal 100B may display a first theme object 901a corresponding to the fifth status request message (refer to FIGS. 11 (c) and (d)).

Moreover, one embodiment of the present invention describes a status request message is transmitted to a plurality of terminals with a single input. Regarding this embodiment, it shall be described with reference to FIG. 12. In particular, FIG. 12 is a diagram illustrating a method of a determining a plurality of terminal to transmit a status request message by a single input according to one embodiment of the present invention.

Figure 12:
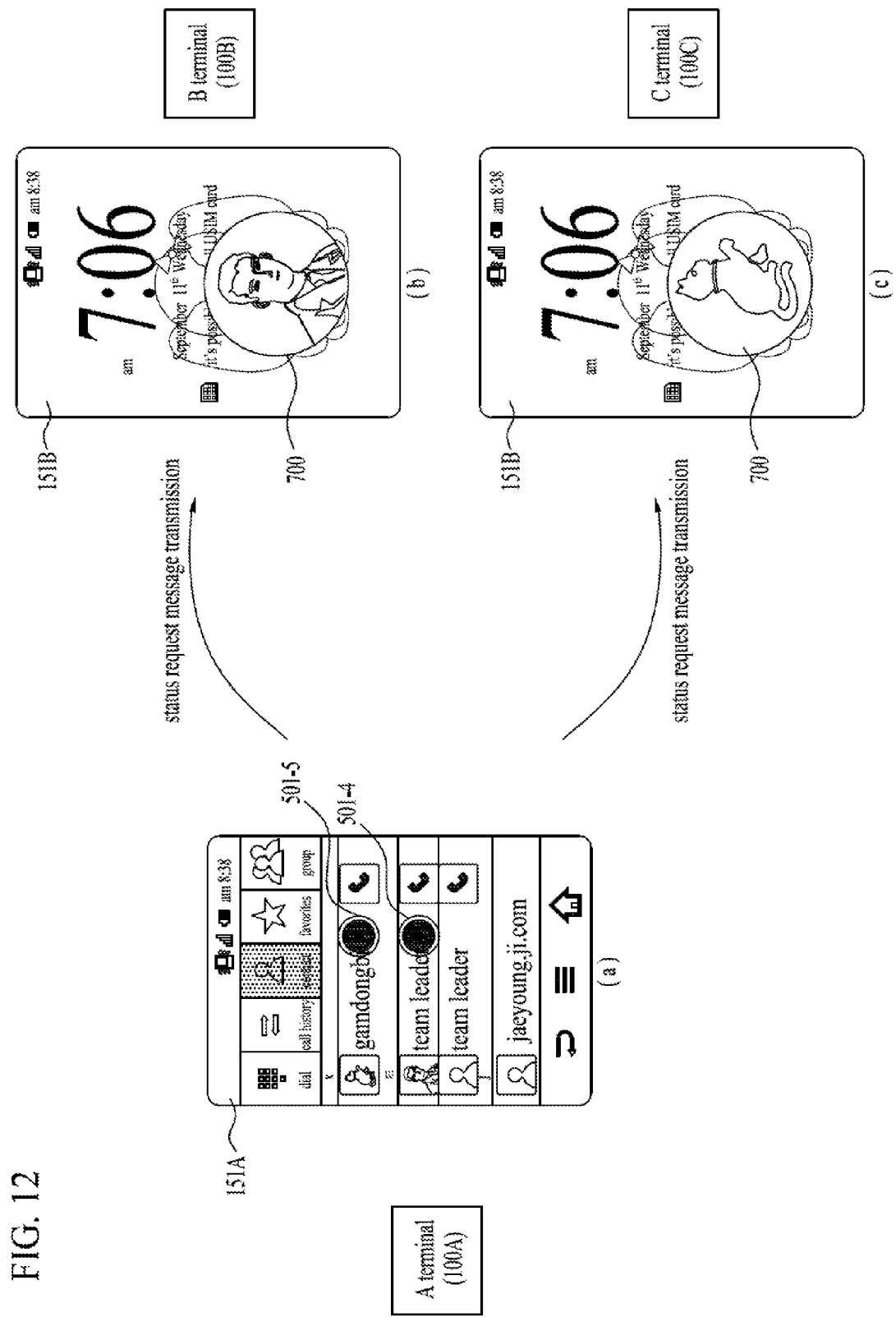
FIG. 12 is a diagram illustrating a method of suggesting a plurality of terminal transmit a status request message by a single input according to one embodiment of the present invention.

Referring to FIG. 12 (a), the A terminal 100A displays at least one contact object and receives tapping inputs 501-4 and 501-5 input on a 'jaeyoung ji' contact object and a 'team leader' contact object, respectively. In particular, if the tapping inputs are received on a plurality of objects, the A controller 180A determines a plurality of counterparts respectively corresponding to each of the objects and can then transmit a status request message to each of a plurality of the determined counterparts. The tapping inputs input on a plurality of the objects may be performed by a user using a plurality of fingers of the user.

In an example depicted in FIG. 12 (a), having received the tapping inputs 501-4 and 501-5, the A controller 180A determines a B terminal 100B and a C terminal 100C, which correspond to each of contact objects, respectively. Subsequently, the A controller 180A can transmit a status request message to each of the determined B terminal 100B and the C terminal 100C. As depicted in FIGS. 12 (b) and (c), having received the status request message, each of the B terminal 100B and the C terminal 100C can display a first notification object 700.

In the aforementioned embodiment, the controlling method of transmitting the status request message has explained. In the following embodiment, a controlling method for a terminal, which has received a status request message, to transmit a reply message in response to the received status request message is explained.

Figure 13:
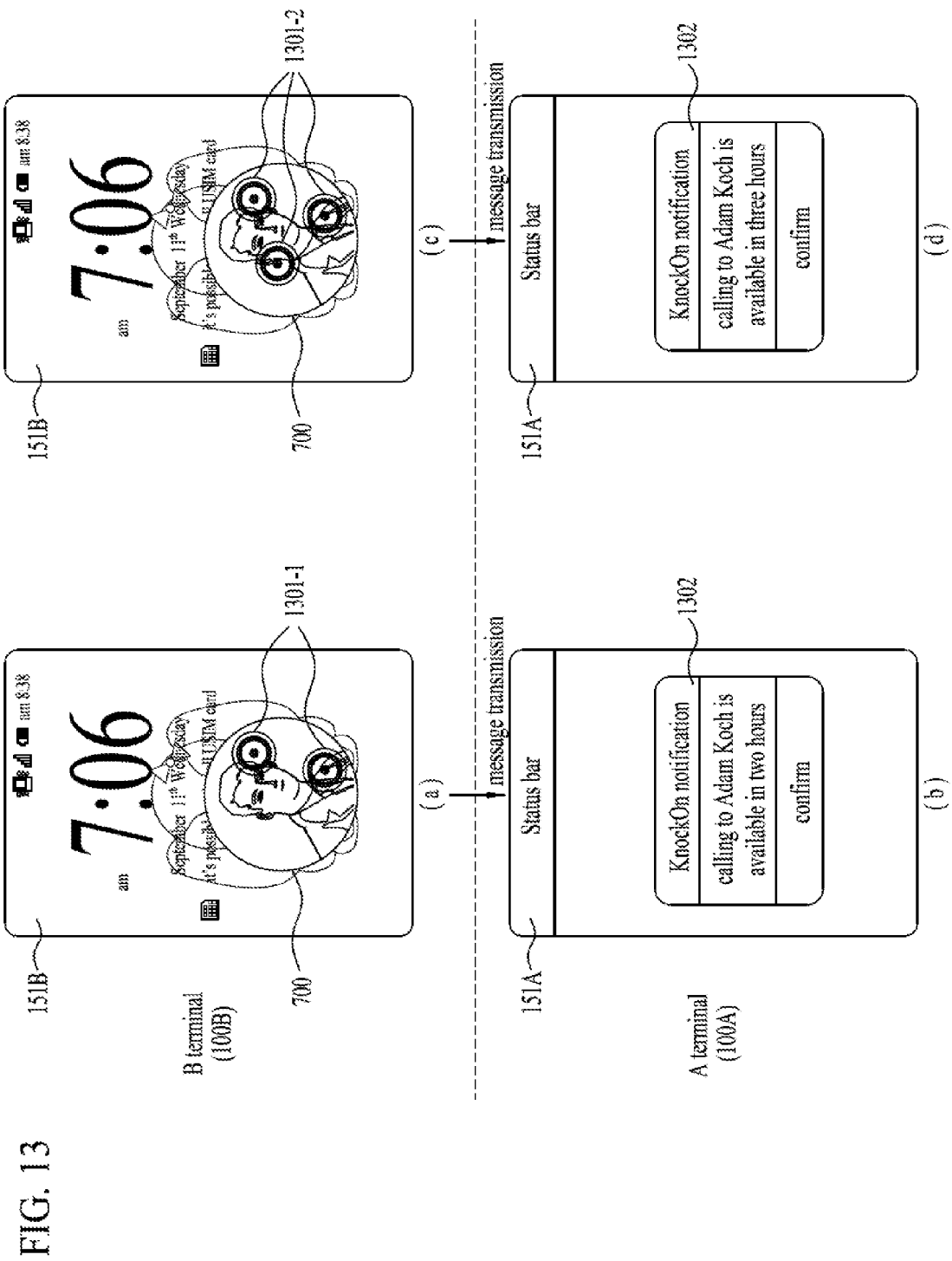
FIG. 13 is a diagram illustrating a controlling method of transmitting a reply message in response to a received status request message according to a different embodiment of the present invention.

In particular, FIG. 13 is a diagram illustrating a controlling method of transmitting a reply message in response to a received status request message according to a different embodiment of the present invention. Referring to FIGS. 13 (a) and (c), the B terminal 100B has received a status request message from the A terminal 100A. The B terminal displays a first notification object 700 on the B touch screen 151B according to one embodiment of the present invention.

When a terminal, which has received a status request message according to one embodiment of the present invention, a reply message is transmitted and which further includes additional information in accordance with the number of fingers performing a tapping input, when the tapping input is received from a user.

As depicted in FIGS. 13 (a) and (b), if tapping inputs (hereinafter first multiple tapping inputs 1301-1) are received using the first number of fingers, the B controller 180B can transmit a first reply message including first additional information. The first additional information may include time information. In an example depicted in FIG. 13 (b), the first additional information notifies that a contact with the B user is currently unavailable and includes information on required time to a state that the contact with the B user becomes available.

Having received the first reply message, the A terminal 100A can display a pop-up window 1302 displaying content of the first replay message. In the examples of FIGS. 13 (a) and (b), the first multiple tapping inputs, which are input by using two fingers, can display that a user needs to wait about 2 hours to contact with a counterpart. Hence, as depicted in FIG. 13 (b), the pop-up window 1302 can display information that a phone call with a counterpart is available in 2 hours.

Subsequently, as depicted in FIGS. 13 (c) and (d), if tapping inputs (second multiple tapping inputs 1301-2) are received by using the second number of fingers, the B controller 180B can transmit a second reply message including second additional information. Having received the second reply message, the A terminal 100A can display the pop-up window displaying content of the second reply message.

In the examples of FIGS. 13 (c) and (d), the second multiple tapping inputs, which are input by using three fingers, can display that a user needs to wait about 3 hours to contact with a counterpart. Hence, as depicted in FIG. 13 (d), the pop-up window 1302 can display information that a phone call with a counterpart is available in 3 hours.

Moreover, one embodiment of the present invention further transmits a message for hastening a check of a text message to a counterpart. Regarding this embodiment, it shall be explained with reference to FIG. 14 and FIG. 15. In particular, FIG. 14 is a diagram illustrating a controlling method of transmitting a message for hastening a check of a text message according to one embodiment of the present invention.

Figure 14:
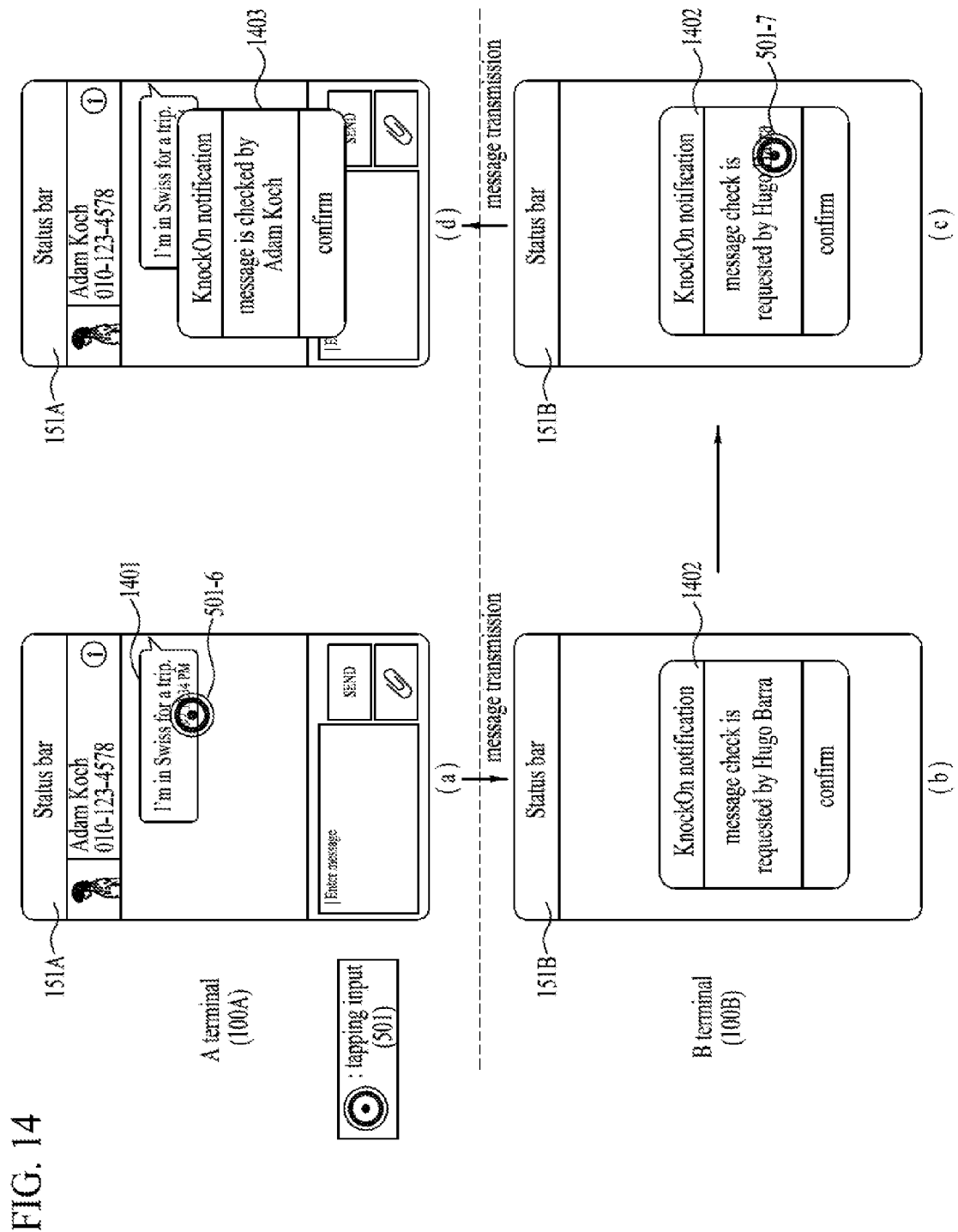
FIG. 14 is a diagram illustrating a controlling method of transmitting a message for hastening a check of a text message according to one embodiment of the present invention.

Referring to FIG. 14 (a), the A terminal 100A displays at least one object via the A touch screen 151A. Specifically, the at least one object may correspond to a transmitted text message object 1401. If a tapping input 501-6 is received on the transmitted text message object 1401, the A controller 180A identifies a counterpart terminal (B terminal) corresponding to the transmitted text message 1401 and can further transmit a message for hastening a check of the transmitted text message to the identified counterpart terminal 100B (refer to FIG. 14 (b)). The identified counterpart means a recipient of the transmitted text message.

As depicted in FIG. 14 (b), having received the message for hastening the check, the B terminal 100B can further display a pop-up window 1402 indicating that the message for hastening the check has received via the B touch screen 151B. If the B user inputs a tapping input 501-7 on the pop-up window 1402, the B terminal 100B can further transmit a check completion message indicating that the message for hastening the check has been checked (refer to FIGS. 14 (c) and (d)). Subsequently, as depicted in FIG. 14 (d), having received the check completion message from the B terminal 100B, the A terminal 100A can further display a pop-up window 1403 indicating that the check completion message has been received.

Meanwhile, a controlling method of additionally designating a theme to the aforementioned message for hastening the check is explained with reference to FIG. 15. In particular, FIG. 15 is a diagram illustrating a controlling method of transmitting additional information together with a message for hastening a check of a text message according to one embodiment of the present invention.

Figure 15:
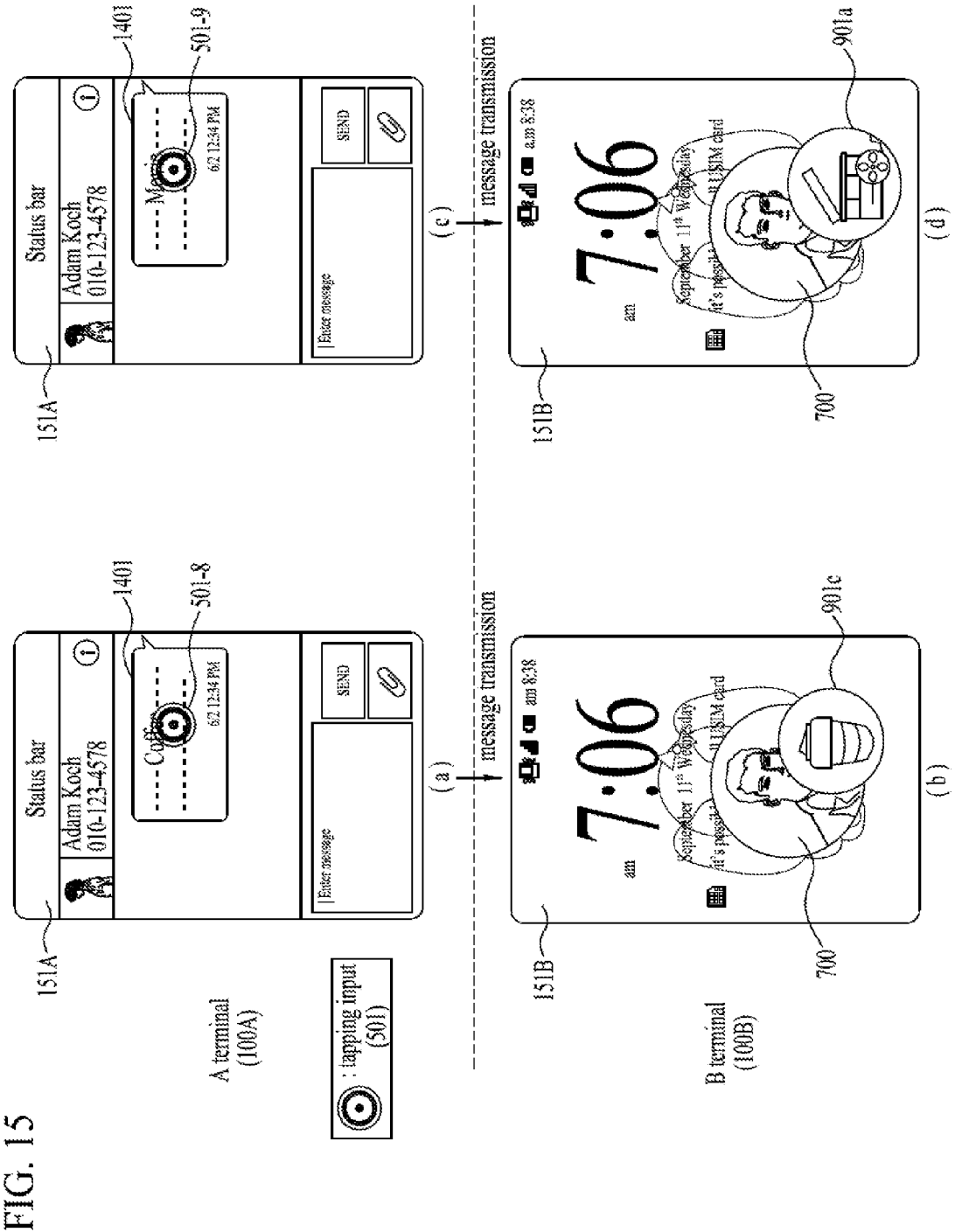
FIG. 15 is a diagram illustrating a controlling method of transmitting additional information together with a message for hastening a check of a text message according to one embodiment of the present invention.

Referring to FIG. 15 (a), the A terminal 100A displays at least one object via the A touch screen 151A. Specifically, the at least one object may correspond to a transmitted text message object 1401. If a tapping input 501-8 is received on a prescribed word included in the transmitted text message object 1401, the A controller 180A can transmit a message for hastening a check including a theme, which corresponds to the prescribed word.

For instance, if the tapping input 501-8 is received on a word 'coffee' included in the transmitted text message, the A controller 180A can transmit the message for hastening the check of the transmitted text message together with coffee theme information. Having received both of the message for hastening the check and the coffee theme information, the B terminal 100B can display a third theme object 901c for indicating a coffee theme as well as a first notification object 700.

Referring to FIG. 15 (c), the transmitted text message object 1401 is displayed via the A touch screen 151A. In an example depicted in FIG. 15 (c), a tapping input 501-9 is received on a word 'Movie' included in the transmitted text message object 1401. If the tapping input 501-9 is received, the A controller 180A can transmit movie theme information together with the message for hastening the check of the transmitted text message to the B terminal. Having received both of the message for hastening the check and the movie theme information, the B terminal 100B can display a first theme object 901a for indicating a movie theme as well as a first notification object 700.

The aforementioned embodiment corresponds to the controlling method of transmitting the message for hastening the check of the transmitted text message when a tapping input is received on the transmitted text message object. In the following embodiment, a controlling method of transmitting a check completion message when a tapping input is received on the transmitted text message object is explained.

Figure 16:
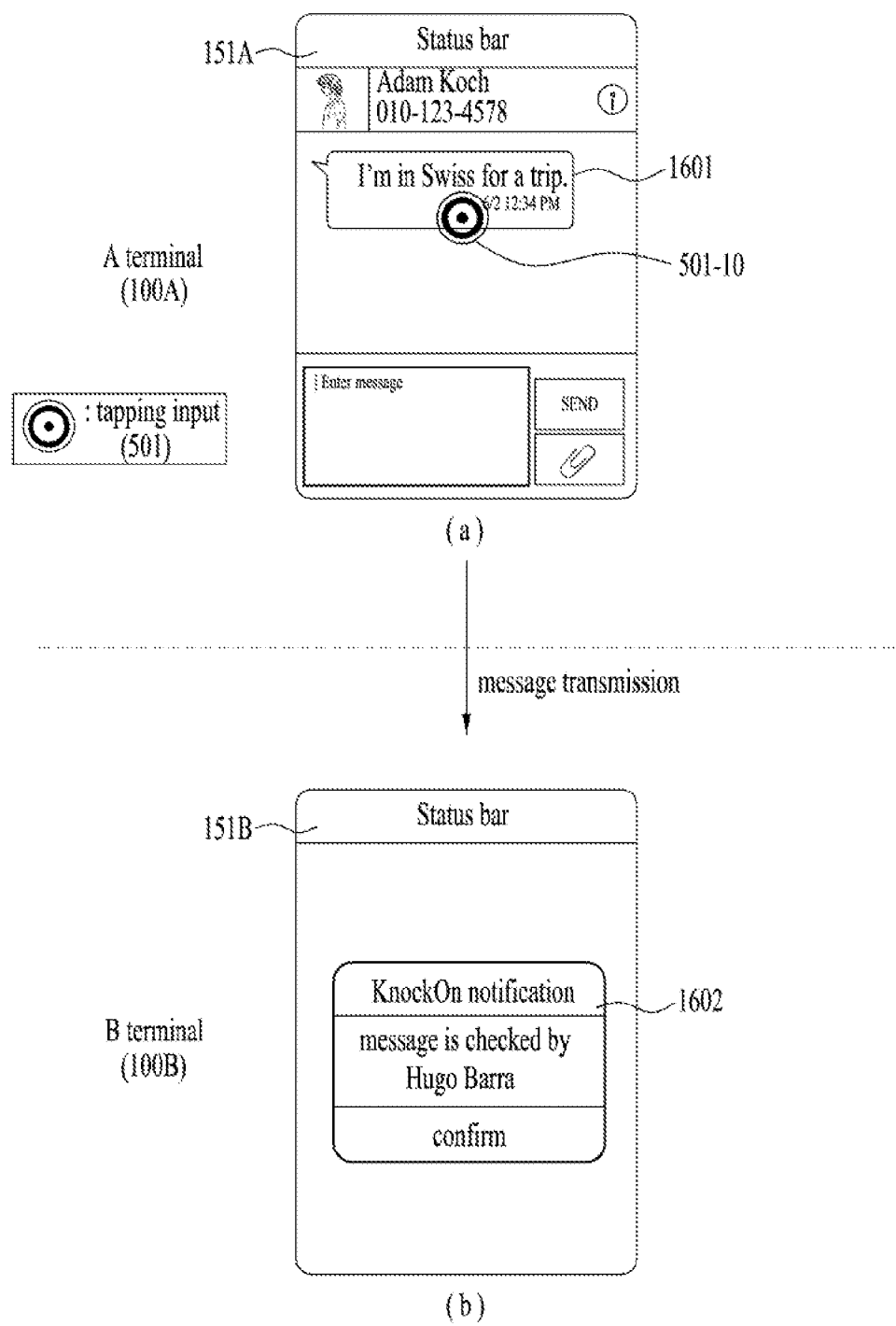
FIG. 16 is a diagram illustrating a controlling method of transmitting a check completion message in response to a tapping input performed on a received text message according to one embodiment of the present invention.

FIG. 16 is a diagram illustrating a controlling method of transmitting a check completion message in response to a tapping input performed on a received text message according to one embodiment of the present invention. Referring to FIG. 16 (a), the A terminal 100A is executing a text transceiving application via the A touch screen 151A and at least one received text message object 1601 is included in FIG. 16 (a).

If a tapping input 501-10 is received on the received text message object 1601, the A controller 180A identifies a counterpart corresponding to the received text message object 1601 and can transmit a check completion message to the identified counterpart. The identified counterpart may correspond to a transmitter of the received text message object 1601.

Having received the check completion message, the B terminal 100B can display a pop-up window 1602 indicating that the A user has checked the text message in the B touch screen 151B. Moreover, the present invention further describes an embodiment where the tapping input is received on a picture viewing screen of a gallery application. Regarding this embodiment, it shall be described with reference to FIG. 17 to FIG. 20 in the following.

Figure 17:
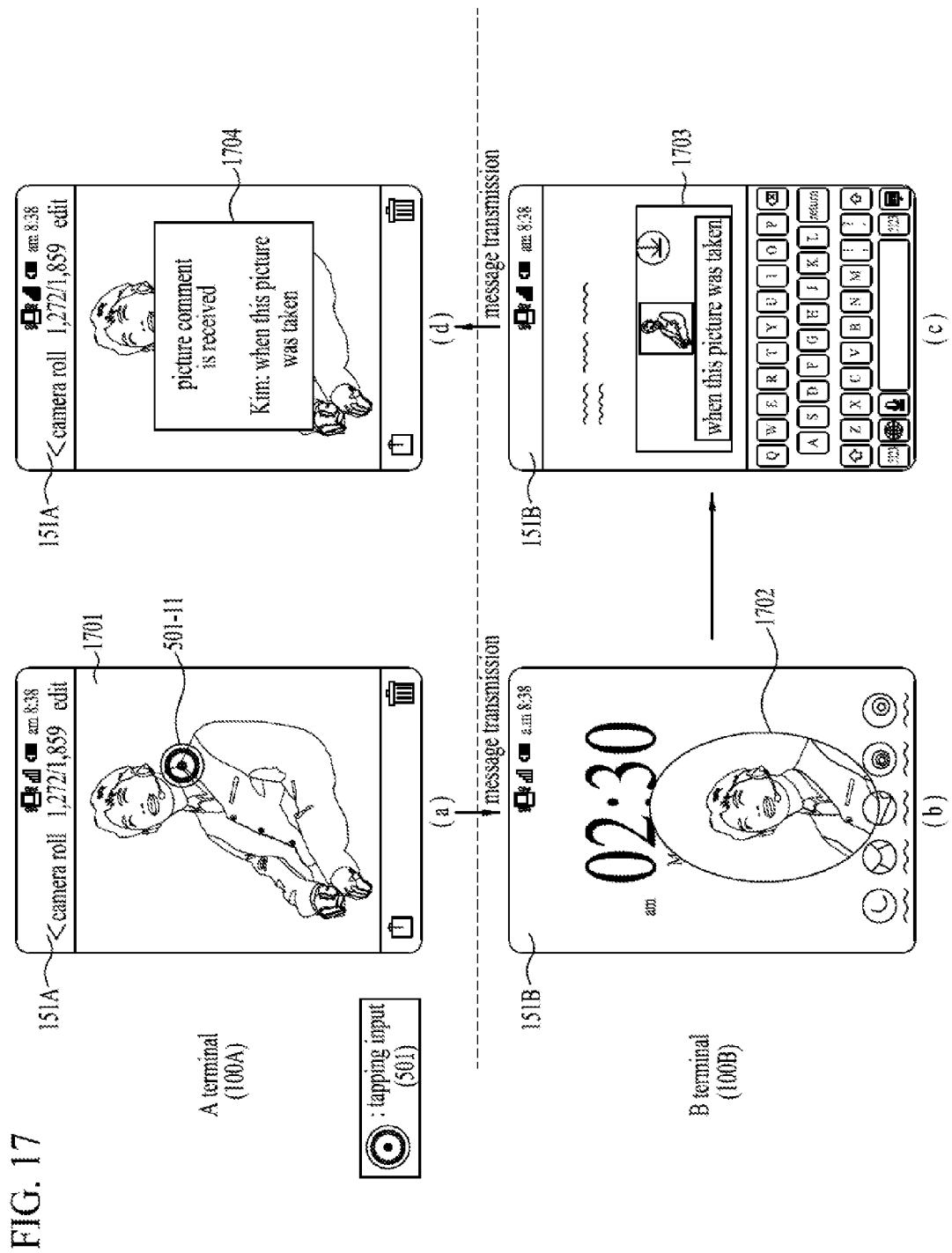
FIG. 17 is a diagram illustrating a controlling method of transmitting a prescribed message according to one embodiment of the present invention when a tapping input is received on a gallery application.

FIG. 17 is a diagram illustrating a controlling method of identifying a counterpart in response to a tapping input received on a prescribed image and transmitting a prescribed message to the identified counterpart according to one embodiment of the present invention. Referring to FIG. 17 (a), the A user views a first image 1701 via a picture viewing application of the A terminal 100A. If a tapping input 501-11 is received on a viewing screen of the first image 1701, the A controller 180A identifies a counterpart (B user) corresponding to the first image 1701. In addition, the A controller 180A can transmit a sharing request message for the identified counterpart. In this instance, the sharing request message may correspond to a message transmitted to the B user in order for the A user to share the first image 1701 with the B user.

In an example depicted in FIG. 17, a face recognition algorithm recognizes a face of at least one person appearing in the first image 1701 and an identified user is a counterpart corresponding to the recognized face. Having received the sharing request message, the B terminal 100B can further display an image sharing object 1702 via the B touch screen 151B. The image sharing object 1702 may include a whole or a part of the display of the first image 1701 which is used to be displayed in the A terminal 100A (refer to FIG. 17 (b)).

Having received the image sharing object 1702, the B controller 180B can display a comment writing pop-up window 1703 to receive an input from a user according to a selection of the user. For instance, if an input for touching the sharing object 1702 is received, the B controller 180B can display the comment writing pop-up window 1703 in the B touch screen 151B to receive a comment input in the first image 1701.

If a comment is written via the displayed comment writing pop-up window 1703 and then a confirm button is pushed, the B controller 180B can transmit a message in which the comment is written to the A terminal 100A. Having received the message in which the comment is written, the A terminal 100A can control the A touch screen 151A to display a pop-up window 1704 displaying the written comment.

Figure 18:
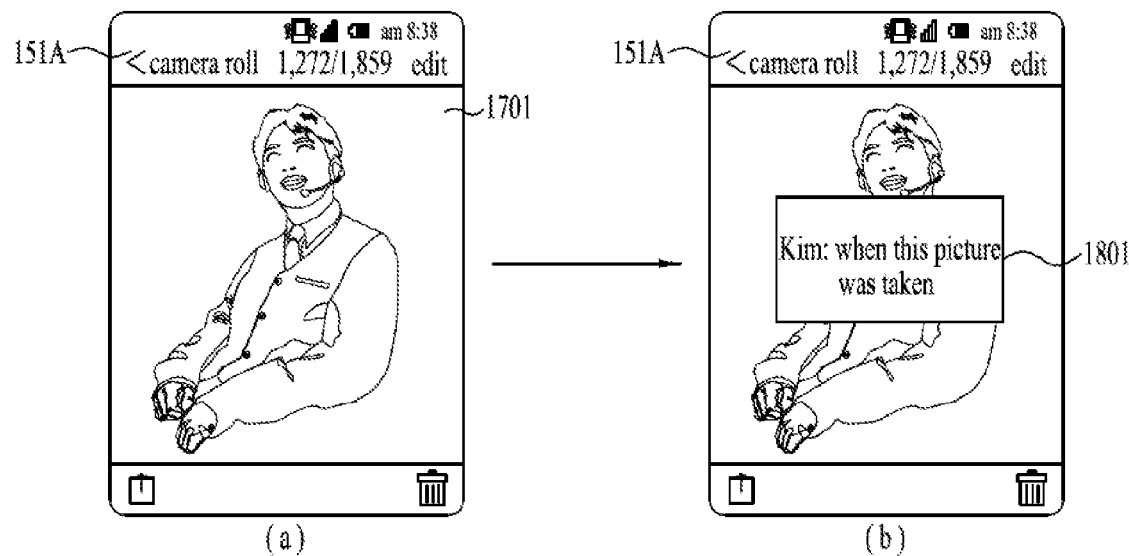
FIG. 18 is a diagram illustrating a controlling method of checking a comment written for a prescribed picture according to one embodiment of the present invention.

FIG. 18 is a diagram illustrating a controlling method of checking a comment written for a prescribed picture according to one embodiment of the present invention. In FIG. 18, assume that a message identical to the message, which is received in the A terminal 100A, is received as well.

Referring to FIG. 18 (a), the A user views an image 1701 identical to the image depicted in FIG. 17 via a picture viewing application of the A terminal 100A. If a prescribed input is received on the image 1701 while the A user is viewing the image 1701, a pop-up window 1801 for displaying a comment, which has been written in relation to the image 1701, can be displayed. If there exists a plurality of comments associated with the image 1701, the pop-up window 1801 may include a plurality of the comments.

In the aforementioned embodiment of FIG. 17, the face recognition algorithm is applied to a prescribed image to identify a transmitter of an image, by which the present invention may be non-limited. A different example is explained with reference to FIG. 19. In particular, FIG. 19 is a diagram illustrating a controlling method of identifying a counterpart to transmit a sharing request message associated with a prescribed image according to one embodiment of the present invention.

Figure 19:
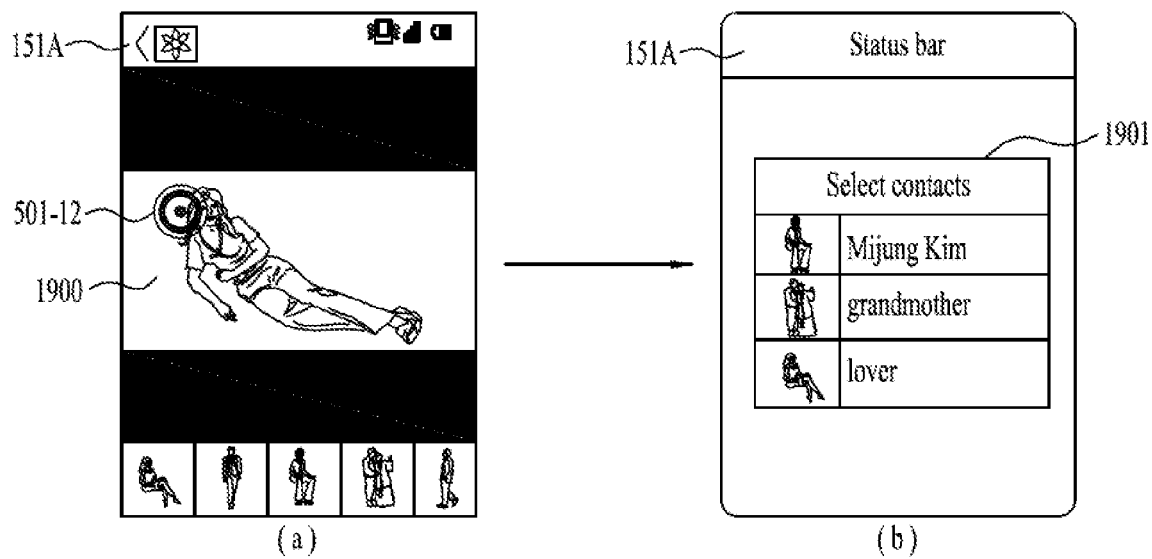
FIG. 19 is a diagram illustrating a controlling method of identifying a counterpart to transmit a sharing request message associated with a prescribed image according to one embodiment of the present invention.

Referring to FIG. 19 (a), the A user views a second image 1900 via a picture viewing application of the A terminal 100A. If a tapping input 501-12 is input on the second image 1900, the A controller 180A can display a counterpart identification pop-up window 1901 to identify a prescribed counterpart. The counterpart identification pop-up window 1901 in the embodiment of FIG. 19 is a pop-up window configured for a user to select a transmitter of a message. The pop-up window can be displayed when the face recognition algorithm is not properly working on a prescribed image or a counterpart corresponding to a recognized face does not exist in a contact list.

If at least one counterpart is selected via the counterpart identification pop-up window 1901, the A controller 180A can transmit the sharing request message, which is described in FIG. 18, to a terminal of the identified at least one counterpart. The messages, which are transmitted in response to a tapping input, can also be applied by using a short-range communication.

One embodiment of appropriately using the short-range communication is explained with reference to FIG. 20. In particular, FIG. 20 is a diagram illustrating a controlling method of transmitting a message in response to a tapping input performed on a list of terminals capable of performing a short-range communication according to one embodiment of the present invention.

Figure 20:
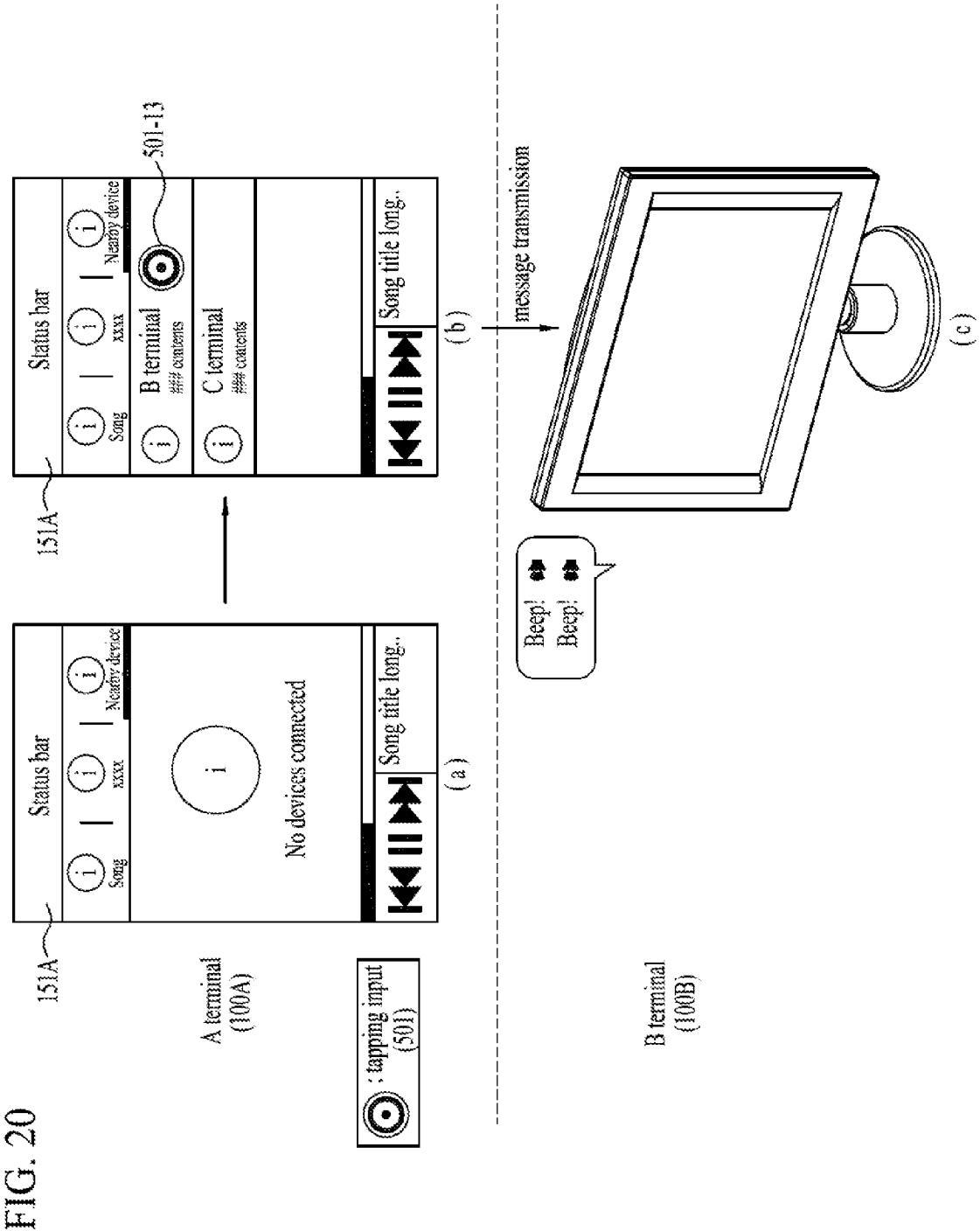
FIG. 20 is a diagram illustrating a controlling method of transmitting a message in response to a tapping input performed on a list of terminals capable of performing a short-range communication according to one embodiment of the present invention.

Referring to FIG. 20 (a), a short-range control application configured to perform a short-range communication using a prescribed short-range communication method is depicted. According to an example depicted in FIG. 20 (a), it shows that there is no short-range communication terminal currently connected.

Having received a prescribed input for establishing a short-range communication connection, the A terminal 100A can display a list of terminals having a history of being connected. If a tapping input 501-13 is received on an object corresponding to the B terminal 100B among the list of terminals, the A controller 180A can transmit a call message to the B terminal 100B. The call message is a message used for informing a user of a location of a terminal. If the terminal receives the call message, the terminal can inform the user of the location of the terminal by outputting a prescribed notification signal. For instance, having received the call message, the B terminal 100B controls the audio output module 152 to output a beep sound (refer to FIG. 20 (c)).

According to the aforementioned embodiment, if a user intends to establish a short-range communication connection between two terminals, when a tapping input is put on one of the two terminals, the user can easily specify another terminal via the tapping input. This is because, if terminals intended to be connected are simply provided by a list, it is difficult for the user to specify a terminal.

Figure 21:
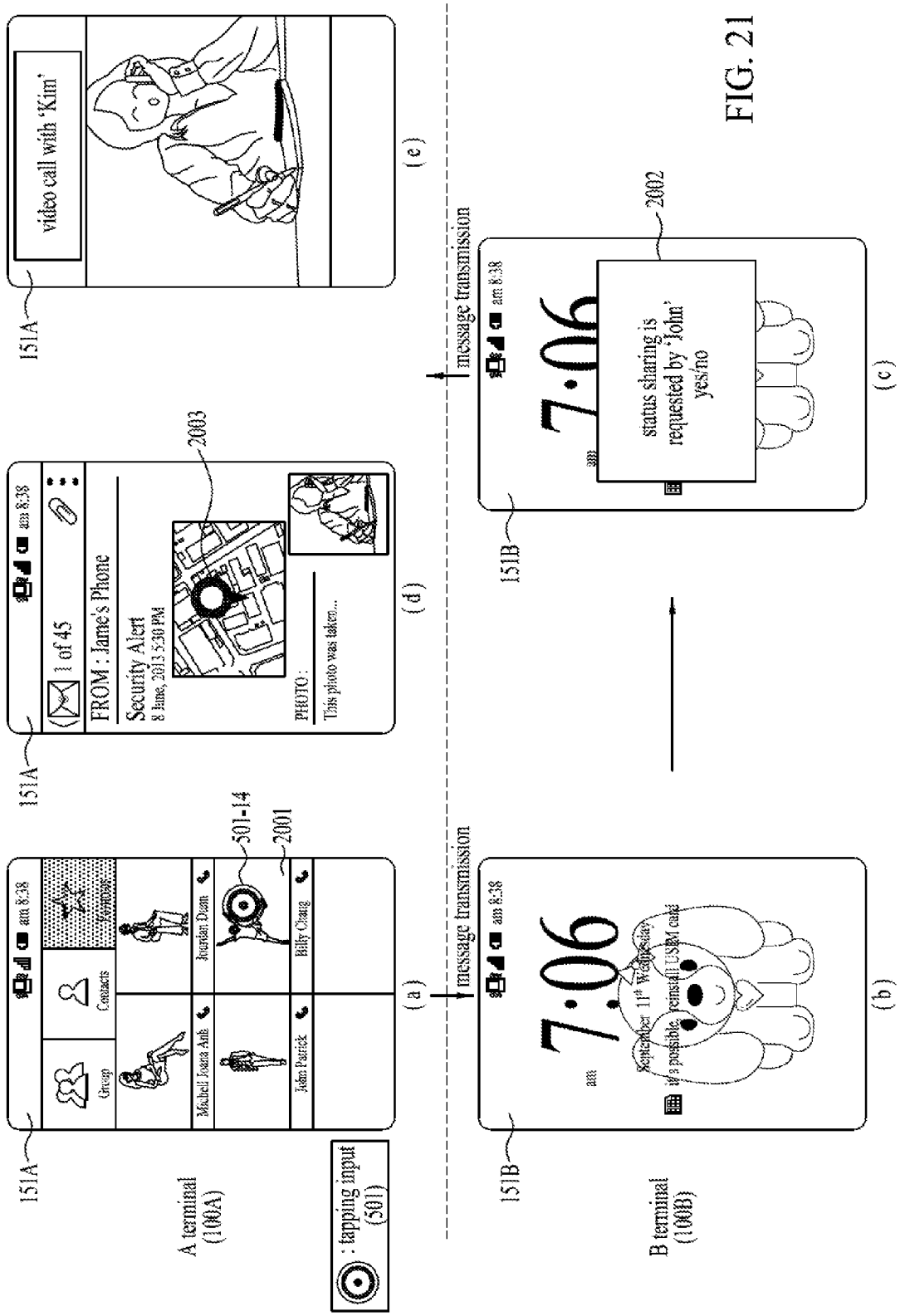
FIG. 21 is a diagram illustrating a controlling method of transmitting a message for requesting a status sharing according to one embodiment of the present invention.

FIG. 21 is a diagram illustrating a controlling method of transmitting a message for requesting a status sharing according to one embodiment of the present invention. Referring to FIG. 21 (a), the A terminal 100A displays at least one contact object by a thumbnail view via the A touch screen 151A and receives a tapping input 501-14 on a prescribed contact object.

Having received the tapping input 501-14, the A controller 180A transmits a status sharing request message to the B terminal 100B. Having received the status sharing request message, the B terminal 100 displays a pop-up window 2002 for inquiring about whether a status is shared. If the B terminal receives an input to share the status, the B terminal can transmit a reply message to the A terminal 100A.

The B terminal 100B according to one embodiment of the present invention can further transmit current location information of the B terminal 100B along with the reply message. The A terminal 100A can display the received current location information of the B terminal 100B on a map (refer to FIG. 21 (d)).

The B terminal 100B according to one embodiment of the present invention can transmit image data (this image data may correspond to a real-time image data), which is received via a B camera 121B of the B terminal 100B, together with the reply message. Having received the image data, the A terminal 100A can display the received image data via the A touch screen 151A. If the image data corresponds to a real-time image data, the image data can be displayed in a video call form. If the image data is displayed in the video call form, the B terminal 100B can add transmission and reception of an audio signal to the image data by transmitting audio data, which is received via a B microphone 122B, together with the reply message.

Meanwhile, one embodiment of the present invention proposes to transmit a message for requesting a connection establishment via a prescribed application in response to a tapping input. Regarding this embodiment, it shall be described with reference to FIG. 22.

Figure 22:
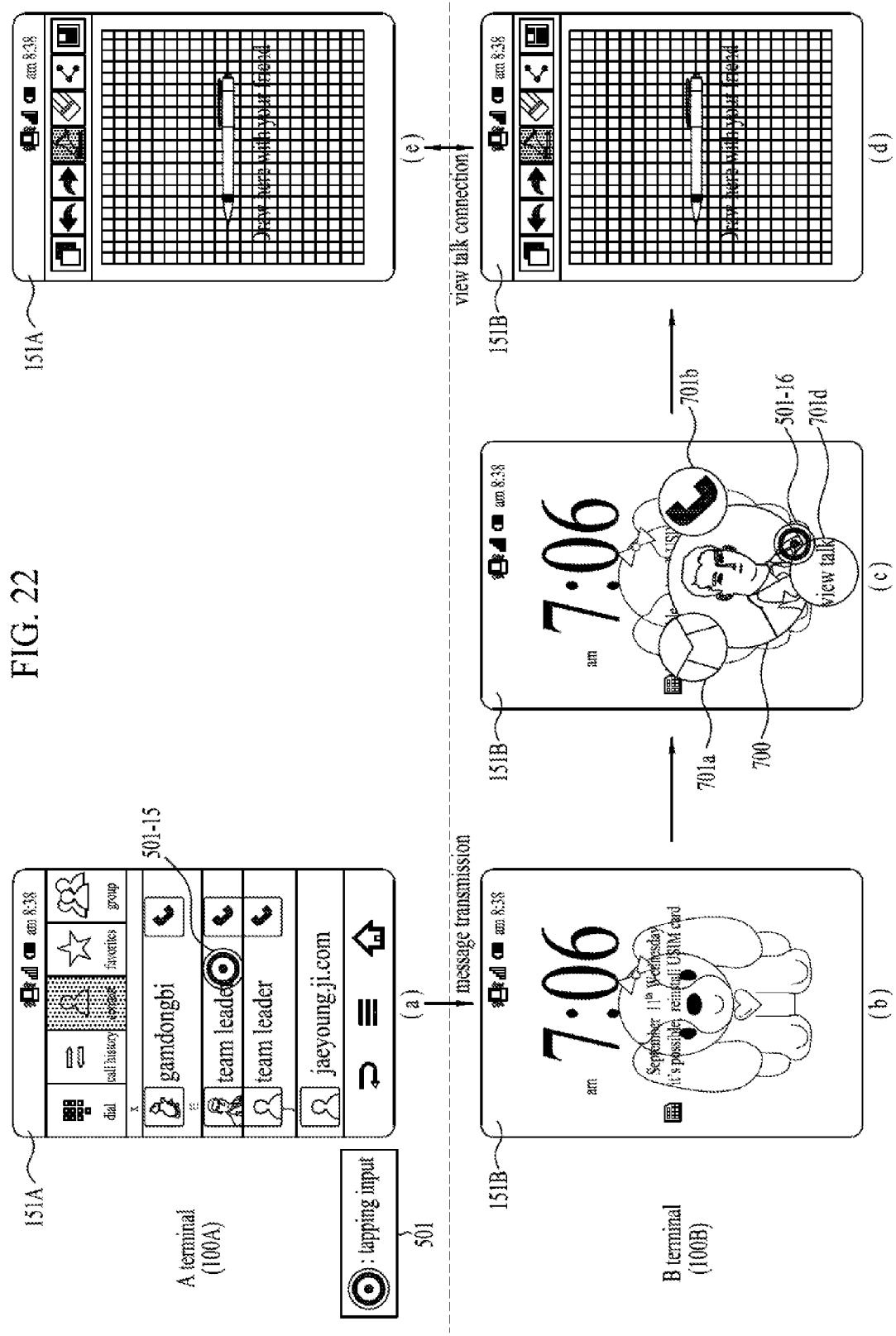
FIG. 22 is a diagram illustrating a controlling method of transmitting a connection establishment request message in response to a tapping input in a mobile terminal according to one embodiment of the present invention.

FIG. 22 is a diagram illustrating a controlling method of transmitting a connection establishment request message in response to a tapping input in a mobile terminal according to one embodiment of the present invention. Referring to FIG. 22 (a), the A touch screen 151A of the A terminal 100A displays a list of contacts while a phone call transceiving application is executing and at least one contact object is output in the list of contacts.

As depicted in FIG. 22 (a), if a tapping input 501-15 is received on such a contact object as 'team leader', the A controller 180A can identify a counterpart corresponding to the contact object such as 'team leader'. Subsequently, the A controller 180A can control the A wireless communication unit 110A to transmit a sixth status message to a terminal 100B of the identified counterpart.

Referring to FIG. 22 (b), the B terminal 100B displays a lock screen via the B touch screen 151B. As depicted in FIG. 22 (c), having received the sixth status request message from the A terminal 100A, the B terminal 100B can display a first notification object 700 notifying that the sixth status request message is received via the B touch screen 151B. The B controller 180B can display at least one reply option icon 701a, 701b, and 701d in the B touch screen 151B together with the first notification object 700.

Among a plurality of the displayed reply option icons, a fourth reply option icon 701d corresponds to an option for requesting a connection establishment using a prescribed application. The prescribed application is an application capable of maintaining a connection status between pluralities of terminals using the wireless communication unit 110. The prescribed application can transceive prescribed user input data between pluralities of the terminals while the connection status is maintained. In addition, the prescribed user input data can include handwriting data handwritten by a user as well as a text data input by the user.

If the B terminal 100B receives an input for selecting the fourth reply option icon 701d from the B user, the B terminal can include a message for requesting a connection establishment using the prescribed application in a reply, which is transmitted to the A terminal 100A. The A terminal 100A and the B terminal 100B establish a connection using the prescribed application. If the connection is established, both the A terminal 100A and the B terminal 100B can display an execution state of the prescribed application (refer to FIGS. 22 (d) and (e)).

Figure 23:
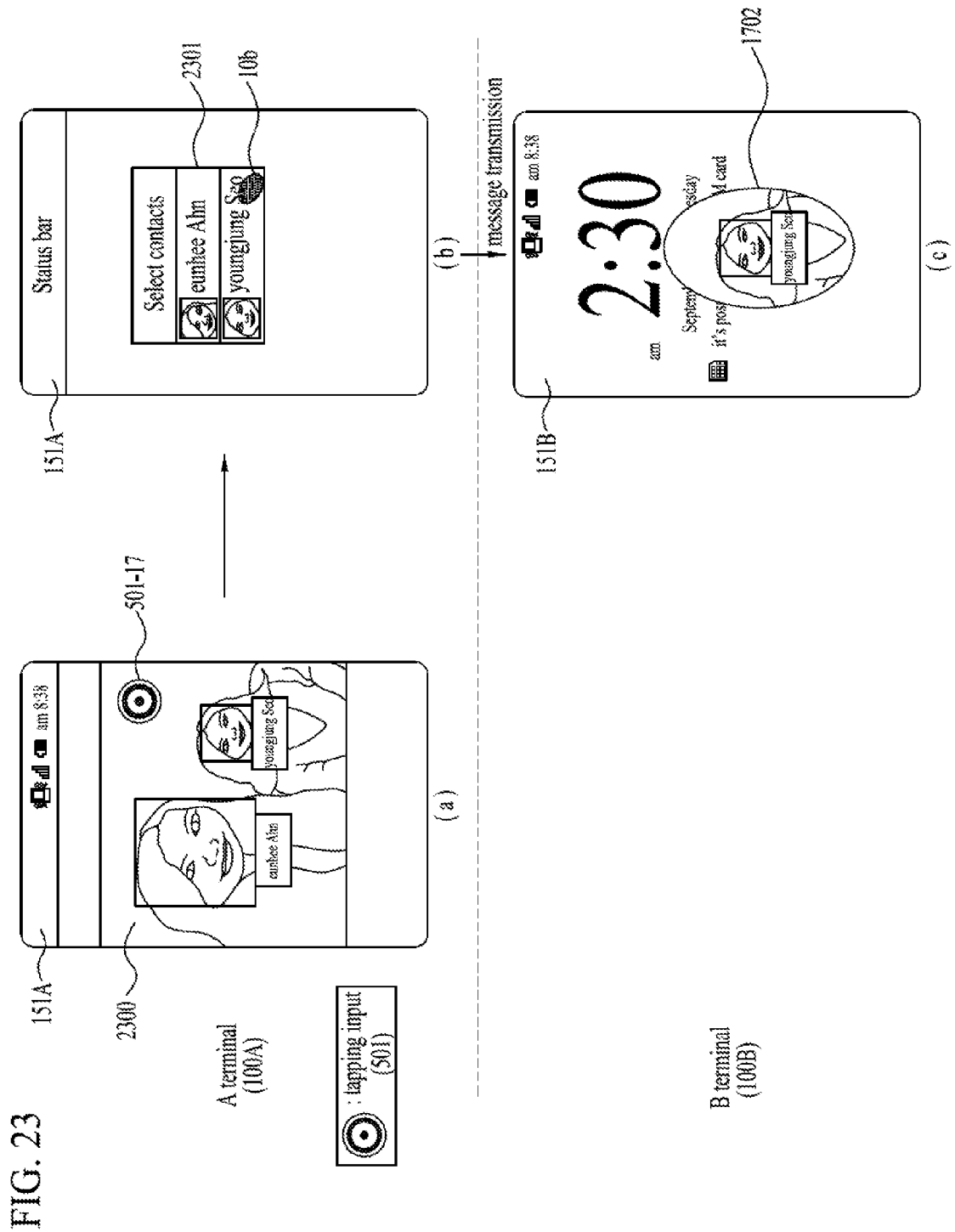
FIG. 23 and FIG. 24 are diagrams illustrating a controlling method of determining a counterpart recipient of a message according to one embodiment of the present invention when a prescribed image includes a plurality of persons.
Figure 24:
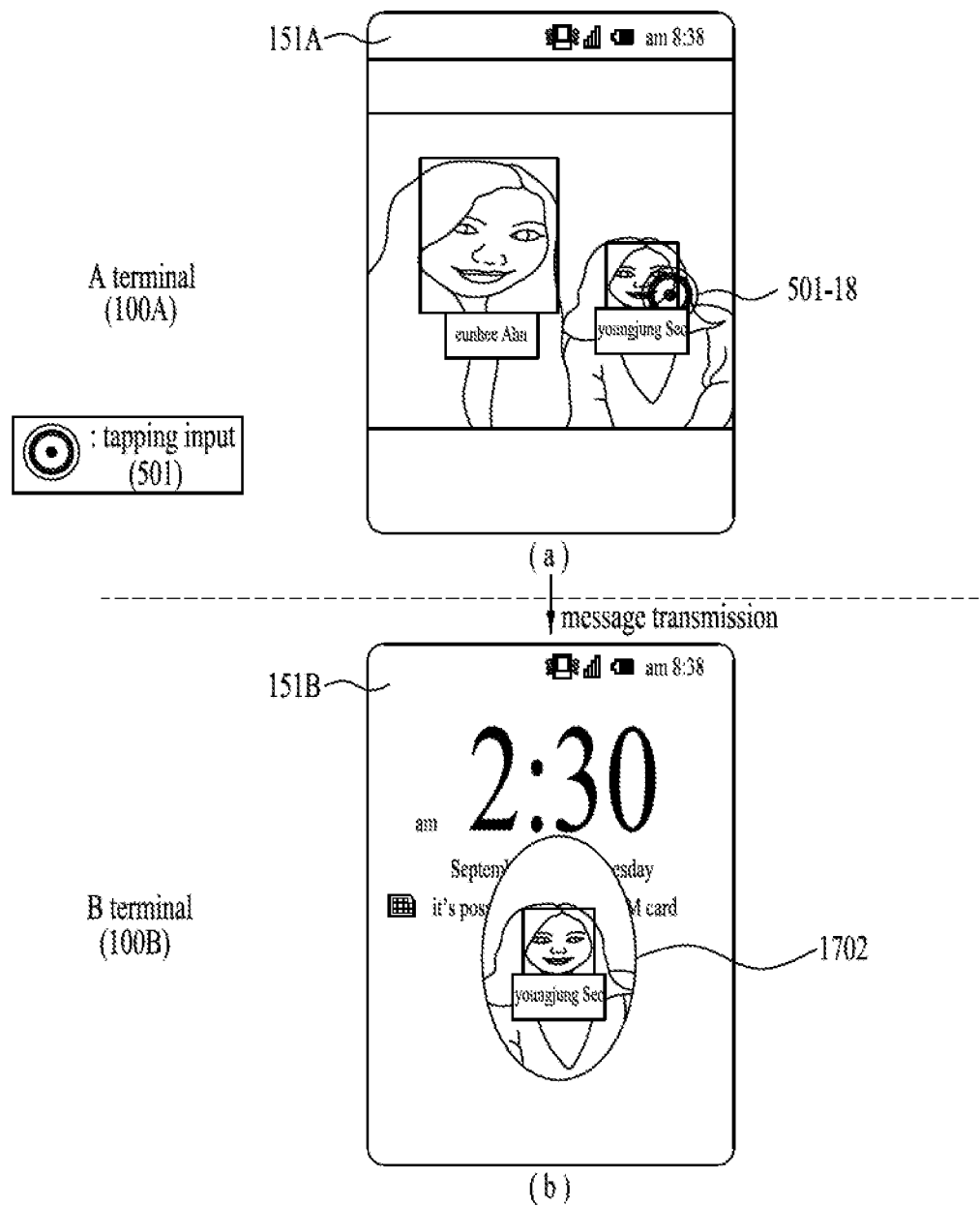

In the aforementioned embodiment of the present invention explained with reference to FIG. 17, the controlling method of transmitting an image is explained using methods such as recognizing a face included in a prescribed image and determining a recipient by a recognized face. In the example of FIG. 17, a case that the number of persons included in an image corresponds to one is explained. However, if pluralities of persons are included in an image, it may be unclear to determine a recipient. Regarding this, it shall be described with reference to FIG. 23 and FIG. 24. FIG. 23 and FIG. 24 are diagrams illustrating a controlling method of determining a counterpart recipient of a message according to one embodiment of the present invention when a prescribed image includes a plurality of persons.

FIG. 23 illustrates that a recipient is selected by a user. Referring to FIG. 23, a third image 2300 is displayed in the A touch screen. In addition, assume that the third image 2300 includes two persons. The controller 180A can perform face recognition for the two persons. Assume that two persons 'eunhee Ahn' and 'youngjung Seo' are recognized in the third image 2300.

If a tapping input 501-17 is received on the third image 2300, the controller 180A can display a counterpart selection window 2301 to make a request for a selection of a user. The counterpart selection window 2301 can include a list of counterparts including the two persons 'eunhee Ahn' and 'youngjung Seo' recognized in the third image 2300. If an input 10b for selecting one of the two persons is received, the controller 180A can transmit a prescribed message to a counterpart terminal, i.e., B terminal 100B, corresponding to the selected person. In addition, having received the prescribed message, the B terminal 100B can display an image sharing object 1702 corresponding to the prescribed message in the touch screen 151B.

Meanwhile, in the example aforementioned with reference to FIG. 23, although it is assumed that the message is transmitted to the counterpart terminal of the selected one person only, if pluralities of persons are selected, it is apparent that the prescribed message can be transmitted to all terminals of a plurality of the selected persons.

In the example aforementioned with reference to FIG. 23, a message is transmitted to the counterpart terminal selected by the counterpart selection window 2301. On the contrary, one embodiment of the present invention, which is to be explained with reference to FIG. 24, proposes to transmit the prescribed message to a counterpart terminal corresponding to a position of a tapping input.

Referring to FIG. 24, the third image 2300 identical to the third image 2300 depicted in FIG. 23 is displayed in the A touch screen. Assume that two persons 'eunhee Ahn' and 'youngjung Seo' are recognized in the third image 2300. If a tapping input 501-18 is received on a face position of a prescribed person, it is proposed that the controller 180A according to one embodiment of the present invention determines the prescribed person as a counterpart and transmits a prescribed message to the prescribed person.

As depicted in FIG. 24 (a), if the tapping input 501-18 is received on the person 'youngjung Seo', the controller 180A controls the wireless communication unit 110A to transmit the prescribed message to a terminal of the person 'youngjung Seo'. Having received the prescribed message, the B terminal 100B can display an image sharing object 1702 corresponding to the prescribed message in the touch screen 151B.

FIG. 25 is a flowchart illustrating a controlling method of identifying a counterpart in response to a tapping input, which is received on a prescribed image, and transmitting a prescribed message to the identified counterpart. In order to explain the flowchart of FIG. 25, the controlling method depicted in FIG. 17 is explained as an example.

As depicted in FIG. 17 (a), the controller 180A outputs a first image 1701 via the A touch screen 151A (S2501). In this instance, the first image 1701 may correspond to an image displayed via an image viewing function of a gallery application. If a tapping input 501-11 is received on a viewing screen of the first image 1701 (S2502), the A controller 180A identifies a counterpart (B user) corresponding to the first image 1701 (S2502). Subsequently, the A controller 180A can control the wireless communication unit to transmit a sharing request message for the identified counterpart (S2504).

Accordingly, the present specification is directed to an apparatus and method thereof that substantially obviate one or more problems due to limitations and disadvantages of the related art. According to one or more embodiments of the present invention, a knock-on input, which is received on a body of the mobile terminal, can be detected.

Further, according to one or more embodiments of the present invention, an intuitive controlling method of the mobile terminal can be provided via a knock-on input received on a body of the mobile terminal.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to perform wireless communication;
a touch screen;
a sensor configured to detect a tapping input on the touch screen; and
a controller configured to:
display an object on the touch screen corresponding to a remote counterpart terminal,
receive a multi-tapping input on the object,
recognize the multi-tapping input and a strength of the multi-tapping input, and
control the wireless communication unit to wirelessly transmit a prescribed request message among a plurality of stored request messages to the remote counterpart terminal in response to the multi-tapping input.

2. The mobile terminal of claim 1, wherein the displayed object corresponds to a contact object included in a list of contacts stored in the memory.

3. The mobile terminal of claim 1, wherein the controller is further configured to:
display a plurality of theme objects corresponding to the displayed object on the touch screen in response to the multi-tapping input, and
receive a selection of one of the plurality of the theme objects, and
wherein the prescribed request message is a message corresponding to the selected theme object.

4. The mobile terminal of claim 3, wherein the plurality of the theme objects correspond to at least one of a movie theme, a coffee theme, and a meals theme.

5. The mobile terminal of claim 1, wherein the controller is further configured to:
receive a different multi-tapping input on the displayed object, and
control the wireless communication unit to transmit the prescribed request message as an urgent prescribed request message.

6. The mobile terminal of claim 1, wherein the received multi-tapping input includes a tapping input pattern, and
wherein the prescribed request message has a theme corresponding to the tapping input pattern.

7. The mobile terminal of claim 1, wherein the displayed object corresponds to a transmitted text message transmitted to the remote counterpart terminal, and
wherein the controller is further configured to control the wireless communication unit to transmit the prescribed request message to the remote counterpart terminal.

8. The mobile terminal of claim 7, wherein the prescribed request message corresponds to a message for hastening a check of the text message transmitted to the remote counterpart terminal.

9. The mobile terminal of claim 1, wherein the displayed object corresponds to a received text message received from the remote counterpart terminal, and
wherein the controller is further configured to control the wireless communication unit to transmit the prescribed request message to the remote counterpart terminal.

10. The mobile terminal of claim 9, wherein the prescribed request message corresponds to a message for informing the remote counterpart terminal a user of the mobile terminal has checked the text message.

11. The mobile terminal of claim 1, wherein the prescribed request message corresponds to a message for requesting the remote counterpart terminal join a prescribed application with the mobile terminal, and
wherein if the request of the prescribed message is accepted, the controller is further configured to control the wireless communication unit to join the prescribed application with the remote counterpart terminal.

12. The mobile terminal of claim 1, wherein the controller first determines a touch area of the multi-tapping input and then determines the strength of the multi-tapping input in proportion to the touched area.

13. A mobile terminal, comprising:
a wireless communication unit configured to perform wireless communication;
a touch screen;
a sensor unit configured to detect a tapping input on the touch screen; and
a controller configured to:
display an object on the touch screen corresponding to a counterpart terminal, receive a multi-tapping input on the object,
recognize the multi-tapping input and a strength of the multi-tapping input, and
control the wireless communication unit to transmit a prescribed request message among a plurality of stored request messages to the counterpart terminal in response to the multi-tapping input,
wherein the displayed object corresponds to an image, and
wherein the controller is further configured to transmit the prescribed request message to the remote counterpart terminal corresponding to the displayed image.

14. The mobile terminal of claim 13, wherein the controller is further configured to recognize a face of at least one person contained in the displayed image and identify the remote counterpart terminal based on the recognized face.

15. The mobile terminal of claim 14, further comprising:
a memory configured to store contact information and face recognition information,
wherein the controller is further configured to identify the remote counterpart terminal based on contact information corresponding to the recognized face.

16. The mobile terminal of claim 14, wherein the prescribed request message includes at least a part of the image.

17. The mobile terminal of claim 16, wherein the controller is further configured to store comment information received from the remote counterpart terminal commenting about the image, and display the comment information on the touch screen in response to a comment display command.

18. A method of controlling a mobile terminal, the method comprising:
detecting, via a sensor, a tapping input on a touch screen of the mobile terminal;
displaying, via the touchscreen, an object on the touch screen corresponding to a remote counterpart terminal;
receiving, via a controller, a multi-tapping input on the displayed object;
recognizing the multi-tapping input and a strength of the multi-tapping input; and
transmitting, via a wireless communication unit, a prescribed request message among a plurality of stored request messages to the remote counterpart terminal in response to the multi-tapping input.

19. The method of claim 18, wherein the displayed object corresponds to a contact object included in a list of contacts stored in the memory.

20. The method of claim 18, further comprising:
displaying a plurality of theme objects corresponding to the displayed object on the touch screen in response to the multi-tapping input; and
receiving a selection of one of the plurality of the theme objects,
wherein the prescribed request message is a message corresponding to the selected theme object.

21. The method of claim 20, wherein the plurality of the theme objects correspond to at least one of a movie theme, a coffee theme, and a meals theme.

* * * * *